United States Patent
Shan et al.

(10) Patent No.: US 9,772,891 B2
(45) Date of Patent: Sep. 26, 2017

(54) MEMORY ACCESS METHOD, DEVICE, AND SYSTEM

(71) Applicant: Huawei Technologies Co., Ltd., Shenzhen (CN)

(72) Inventors: Shuchang Shan, Beijing (CN); Bing Li, Beijing (CN); Yu Hu, Beijing (CN); Xiang Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 2 days.

(21) Appl. No.: 15/015,303

(22) Filed: Feb. 4, 2016

(65) Prior Publication Data

US 2016/0154687 A1 Jun. 2, 2016

Related U.S. Application Data

(63) Continuation of application No. PCT/CN2014/083874, filed on Aug. 7, 2014.

(30) Foreign Application Priority Data

Aug. 9, 2013 (CN) .......................... 2013 1 0345355

(51) Int. Cl.
*G11C 29/00* (2006.01)
*G06F 11/00* (2006.01)
*G06F 11/10* (2006.01)

(52) U.S. Cl.
CPC ........ *G06F 11/008* (2013.01); *G06F 11/1004* (2013.01)

(58) Field of Classification Search
None
See application file for complete search history.

(56) References Cited

U.S. PATENT DOCUMENTS

| | | | |
|---|---|---|---|
| 2003/0041295 A1 | 2/2003 | Hou et al. | |
| 2008/0055323 A1* | 3/2008 | Franaszek | G06F 12/0897 345/530 |

(Continued)

FOREIGN PATENT DOCUMENTS

| | | |
|---|---|---|
| CN | 102043729 A | 5/2011 |
| CN | 102272855 A | 12/2011 |

(Continued)

OTHER PUBLICATIONS

Foreign Communication From a Counterpart Application, Chinese Application No. 201310345355.X, Chinese Office Action dated Jan. 3, 2017, 5 pages.

(Continued)

*Primary Examiner* — Daniel McMahon
(74) *Attorney, Agent, or Firm* — Conley Rose, P.C.

(57) ABSTRACT

A hierarchical and flexible method for setting a memory reliability level to implement a memory access mechanism for different running object types and different reliability levels. The method implemented by the memory device includes receiving reliability level information of a running object of a processor sent by the processor; establishing a mapping relationship according to the reliability level information of the running object; receiving an access request sent by the processor; and accessing data of the running object and error-tolerant code of the running object according to the access request and the mapping relationship.

13 Claims, 10 Drawing Sheets

(56) References Cited

U.S. PATENT DOCUMENTS

| | | | | |
|---|---|---|---|---|
| 2010/0153777 | A1* | 6/2010 | Hu | G06F 12/0638 714/15 |
| 2011/0271164 | A1 | 11/2011 | Ahn et al. | |
| 2012/0124450 | A1 | 5/2012 | Yang | |
| 2012/0324312 | A1 | 12/2012 | Moyer | |
| 2013/0024646 | A1 | 1/2013 | Liu et al. | |
| 2013/0262921 | A1* | 10/2013 | Gao | G06F 11/1092 714/6.24 |
| 2015/0006841 | A1 | 1/2015 | Chen et al. | |

FOREIGN PATENT DOCUMENTS

| | | | |
|---|---|---|---|
| CN | 102308282 | A | 1/2012 |
| CN | 102323899 | A | 1/2012 |
| CN | 102331977 | A | 1/2012 |
| CN | 102609378 | A | 7/2012 |
| EP | 2383750 | A2 | 11/2011 |
| WO | 2013107393 | A1 | 7/2013 |

OTHER PUBLICATIONS

Yoon, D., et al., "Virtualized and Flexible ECC for Main Memory," Mar. 13-17, 2010, 12 pages.

Foreign Communication From a Counterpart Application, PCT Application No. PCT/CN2014/083874, English Translation of International Search Report dated Nov. 15, 2014, 3 pages.

Foreign Communication From a Counterpart Application, PCT Application No. PCT/CN2014/083874, English Translation of International Search Report dated Nov. 19, 2014, 18 pages.

Foreign Communication Form a Counterpart Application, Korean Application No. 10-2016-7005832, Korean Notice of Allowance and English Translation dated Sep. 23, 2016, 3 pages.

Foreign Communication From a Counterpart Application, European Application No. 14835213.1, Extended European Search Report dated Oct. 7, 2016, 7 pages.

* cited by examiner

```
┌─────────────────────────────────────────────────────────────────┐
│ A processor sets a reliability level of a running object of the │
│   processor, where the reliability level of the running object  │──S201
│   represents a degree of a memory reliability requirement       │
│   imposed by the running object                                 │
└─────────────────────────────────────────────────────────────────┘
                                │
┌─────────────────────────────────────────────────────────────────┐
│ The processor queries a preset correspondence between the       │
│   reliability level of the running object and an error-tolerant │
│   coding method to obtain an error-tolerant coding method       │
│   corresponding to the reliability level of the running         │
│   object, and sends reliability level information of the        │
│   running object of the processor to a memory device, where     │
│   the reliability level information includes identification     │
│   information of the running object and the error-tolerant      │
│   coding method that corresponds to the reliability level of    │
│   the running object, so that the memory device establishes a   │
│   first mapping relationship and a second mapping relationship  │
│   according to the reliability level information of the running│
│   object, where the first mapping relationship includes the     │──S202
│   identification information of the running object, the         │
│   reliability level of the running object, and a data region    │
│   DR in which data of the running object is stored, where the   │
│   identification information, the reliability level, and the    │
│   data region are in a one-to-one correspondence; and the       │
│   second mapping relationship includes the identification       │
│   information of the running object, the reliability level of   │
│   the running object, and a configurable error correction code  │
│   region CECR in which error-tolerant code corresponding to the │
│   data of the running object is stored, where the identification│
│   information, the reliability level, and the configurable      │
│   error correction code region are in a one-to-one correspondence│
└─────────────────────────────────────────────────────────────────┘
                                │
┌─────────────────────────────────────────────────────────────────┐
│ The processor sends an access request to the memory device,     │
│   where the access request includes an identifier of the        │
│   running object, physical address information of the data of   │──S203
│   the running object, and physical address information of the   │
│   error-tolerant code of the running object, so that the memory │
│   device accesses the data of the running object according to   │
│   the access request and the first mapping relationship, and    │
│   accesses the error-tolerant code of the running object        │
│   according to the access request and the second mapping        │
│   relationship                                                  │
└─────────────────────────────────────────────────────────────────┘
```

FIG. 2

MEMORY ACCESS METHOD, DEVICE, AND SYSTEM

CROSS-REFERENCE TO RELATED APPLICATIONS

This application is a continuation of International Application No. PCT/CN2014/083874, filed on Aug. 7, 2014, which claims priority to Chinese Patent Application No. 201310345355.X, filed on Aug. 9, 2013, both of which are hereby incorporated by reference in their entireties.

TECHNICAL FIELD

The embodiments of the present disclosure relates to the field of computer system design, and in particular, to a memory access method, device, and system.

BACKGROUND

As a storage capacity size of a computer system increases gradually, improvement of memory reliability is essential for running stability of the computer system. Currently, error-tolerant code is generally used in the industry to check data of memory, so as to improve memory reliability. Common error-tolerant coding methods include a single error correction-double error detection (SEC-DED) method, a Chipkill (a new memory protection technology developed by the IBM Corporation) method, a Bose, Chaudhuri, and Hocquenghem (BCH) error-tolerant coding method, a dual-mode mirror error-tolerant coding (MIRROR) method, and the like. When a specific running object (for example, an application program, a thread, a process, or a code segment) accesses memory under a condition, the memory can support, only if a suitable error-tolerant coding method is selected, correct access performed by the specific running object to corresponding data, that is, meet a memory reliability requirement of the specific running object. For memory in the prior art, a single error-tolerant coding method is generally used; correspondingly, when the memory is accessed, the single error-tolerant coding method of the memory is also used to check data. For example, in the prior art, an error-tolerant coding method used by memory is a SEC-DED method, where in a process of performing read access to data of an application program, first, error-tolerant code is used to perform error detection on read data, and error-correction code is used to perform error correction only after an error is detected.

The prior art has the following disadvantages: a single error-tolerant coding method is used, which cannot meet a reliability requirement for memory when different running objects access the memory under different conditions.

SUMMARY

Embodiments of the present disclosure provide a memory access method, device, and system, so as to provide a hierarchical and flexible method for setting a memory reliability level to implement a memory access mechanism for different running object types and different reliability levels.

To achieve the foregoing objective, the following technical solutions are adopted in the embodiments of the present disclosure.

According to a first aspect, an embodiment of the present disclosure provides a memory access method, including receiving, by a memory device, reliability level information of a running object of a processor sent by the processor, where the reliability level information includes identification information of the running object and an error-tolerant coding method that corresponds to a reliability level of the running object, and the reliability level of the running object represents a degree of a memory reliability requirement imposed by the running object, establishing, by the memory device, a first mapping relationship and a second mapping relationship according to the reliability level information of the running object, where the first mapping relationship includes the identification information of the running object, the reliability level of the running object, and a data region (DR) in which data of the running object is stored, where the identification information, the reliability level, and the data region are in a one-to-one correspondence, and the second mapping relationship includes the identification information of the running object, the reliability level of the running object, and a configurable error correction code region (CECR) in which error-tolerant code corresponding to the data of the running object is stored, where the identification information, the reliability level, and the CECR are in a one-to-one correspondence, receiving, by the memory device, an access request sent by the processor, where the access request includes the identification information of the running object of the processor, physical address information of the data of the running object, and physical address information of the error-tolerant code of the running object, and accessing, by the memory device, the data of the running object according to the access request and the first mapping relationship, and accessing the error-tolerant code of the running object according to the access request and the second mapping relationship.

In a first possible implementation manner, with reference to the first aspect, the establishing, by the memory device, a first mapping relationship and a second mapping relationship according to the reliability level information of the running object includes: querying, by the memory device, a preset correspondence table between the reliability level of the running object and the error-tolerant coding method according to the error-tolerant coding method in the reliability level information, so as to acquire the reliability level of the running object, querying, by the memory device, a preset correspondence table between the reliability level and the data region according to the reliability level of the running object to acquire the data region corresponding to the reliability level of the running object, and generating the first mapping relationship, and querying, by the memory device, a preset correspondence table between the reliability level and the CECR according to the reliability level of the running object to acquire the CECR corresponding to the reliability level of the running object, and generating the second mapping relationship.

In a second possible implementation manner, with reference to the first aspect or the first possible implementation manner, the memory device receives the access request sent by the processor, the access request includes a read access request, and correspondingly, the accessing, by the memory device, the data of the running object according to the access request and the first mapping relationship, and accessing the error-tolerant code of the running object according to the access request and the second mapping relationship includes querying, by the memory device, the first mapping relationship according to the identification information of the running object to acquire the data region in which the data of the running object is stored, and generating a data read access (RD-d) sub-request for the data region, where the RD-d sub-request includes the data region in which the data of the running object is stored and the physical address information of the data of the running object, and querying the second mapping relationship according to the identification information of the running object to acquire the CECR in which the error-tolerant code of the running object is stored, and generating an error-tolerant code read access (RD-c) sub-request for the CECR, where the RD-c sub-request includes the CECR in which the error-tolerant code of the running object is stored and the physical address information of the error-tolerant code of the object, acquiring, by the memory device, the data of the running object by searching, in the data region included in the RD-d sub-request, for the physical address information of the data of the running object, and acquiring the error-tolerant code of the running object by searching, in the CECR included in the RD-c sub-request, for the physical address information of the error-tolerant code of the running object, checking, by the memory device, the data of the running object according to the error-tolerant code of the running object, so as to acquire accurate data of the running object, and sending, by the memory device, the accurate data of the running object to the processor, where the accurate data is obtained after the checking.

In a third possible implementation manner, with reference to the first aspect or the first possible implementation manner, the memory device receives the access request sent by the processor, the access request includes a write access request and data that needs to be written into the memory device, the write access request includes the identification information of the running object, physical address information of the data that needs to be written into the memory device, and physical address information of error-tolerant code of the data that needs to be written into the memory device, and correspondingly, the accessing, by the memory device, the data of the running object according to the access request and the first mapping relationship, and accessing the error-tolerant code of the running object according to the access request and the second mapping relationship includes querying, by the memory device, the first mapping relationship according to the identification information of the running object to acquire the data region in which the data of the running object is stored, and generating a data write access (WR-d) sub-request for the data region, where the WR-d sub-request includes the data region in which the data of the object is stored and the physical address information of the data that needs to be written into the memory device, and querying the second mapping relationship according to the identification information of the running object to acquire the CECR corresponding to the running object, and generating an error-tolerant code write access (WR-c) sub-request for the CECR, where the WR-c sub-request includes the CECR in which the error-tolerant code of the object is stored and the physical address information of the error-tolerant code of the data that needs to be written into the memory device, searching, by the memory device, the second mapping relationship using the identification information of the running object to obtain the error-tolerant coding method corresponding to the running object, performing, using the error-tolerant coding method corresponding to the object, error-tolerant coding processing on the data that needs to be written into the memory device, so as to acquire the error-tolerant code corresponding to the data that needs to be written into the memory device, and adding, to a write request queue, the data that needs to be written into the memory device and the error-tolerant code corresponding to the data that needs to be written into the memory device, and acquiring, by the memory device by searching, in the data region included in the WR-d sub-request, for the physical address information of the data that needs to be written into the memory device, a first physical address of the data that needs to be written into the memory device, and writing, into the first physical address, the data that is in the write request queue and needs to be written into the memory device, and acquiring, by searching, in the CECR included in the WR-c sub-request, for the physical address information of the error-tolerant code of the data that needs to be written into the memory device, a second physical address of the error-tolerant code of the data that needs to be written into the memory device, and writing, into the second physical address, the error-tolerant code that is in the write request queue and corresponds to the data that needs to be written into the memory device.

In a fourth possible implementation manner, with reference to any one of the first aspect and the first to the third possible implementation manners, when the access request is the read access request, the method further includes receiving, by the memory device, changed reliability level information sent by the processor, where the changed reliability level information includes the identification information of the running object and a new error-tolerant coding method that corresponds to a changed reliability level of the running object, querying, by the memory device, the preset correspondence table between the reliability level of the running object and the error-tolerant coding method according to the new error-tolerant coding method that is in the changed reliability level information and corresponds to the changed reliability level of the running object, and updating the reliability level of the running object in the first mapping relationship and the second mapping relationship, querying, by the memory device, the preset correspondence table between the reliability level and the data region according to an updated reliability level of the running object in the first mapping relationship, and updating the data region in the first mapping relationship, and querying, by the memory device, the preset correspondence table between the reliability level and the CECR according to the updated reliability level of the running object in the second mapping relationship, and updating the CECR in the second mapping relationship.

According to a second aspect, an embodiment of the present disclosure provides a memory access method, including setting, by a processor, a reliability level of a running object of the processor, where the reliability level of the running object represents a degree of a memory reliability requirement imposed by the running object, querying, by the processor, a preset correspondence table between the reliability level of the running object and an error-tolerant coding method to obtain an error-tolerant coding method corresponding to the reliability level of the running object, and sending reliability level information of the running object of the processor to a memory device, where the reliability level information includes identification information of the running object and the error-tolerant coding method that corresponds to the reliability level of the running object so that the memory device establishes a first mapping relationship and a second mapping relationship according to the reliability level information of the running object, where the first mapping relationship includes the identification information of the running object, the reliability level of the running object, and a data region data region in which data of the running object is stored, where the identification information, the reliability level, and the data region are in a one-to-one correspondence, and the second mapping relationship includes the identification information of the running object, the reliability level of the running object, and a CECR in which error-tolerant code corresponding to the data of the running object is stored, where the identification information, the reliability level, and the CECR are in a one-to-one correspondence, and sending, by the processor, an access request to the memory device, where the access request includes an identifier of the running object, physical address information of the data of the running object, and physical address information of the error-tolerant code of the running object so that the memory device accesses the data of the running object according to the access request and the first mapping relationship, and accesses the error-tolerant code of the running object according to the access request and the second mapping relationship.

In a first possible implementation manner, with reference to the second aspect, the method further includes changing, by the processor, the reliability level of the running object and obtaining a new error-tolerant coding method that corresponds to a changed reliability level of the running object, and sending, by the processor, changed reliability level information to the memory device, where the changed reliability level information includes the identification information of the running object and the new error-tolerant coding method that corresponds to the changed reliability level of the running object so that the memory device queries the preset correspondence table between the reliability level of the running object and the error-tolerant coding method according to the new error-tolerant coding method that is in the changed reliability level information and corresponds to the changed reliability level of the running object, and updates the reliability level of the running object in the first mapping relationship and the second mapping relationship, queries a preset correspondence table between the reliability level and the data region according to an updated reliability level of the running object in the first mapping relationship, and updates the data region in the first mapping relationship, and queries a preset correspondence table between the reliability level and the CECR according to the updated reliability level of the running object in the second mapping relationship, and updates the CECR in the second mapping relationship.

According to a third aspect, an embodiment of the present disclosure provides a memory device, including a receiving unit configured to receive reliability level information of a running object of a processor sent by the processor, where the reliability level information includes identification information of the running object and an error-tolerant coding method that corresponds to a reliability level of the running object, and the reliability level of the running object represents a degree of a memory reliability requirement imposed by the running object, a mapping relationship establishing unit configured to establish a first mapping relationship and a second mapping relationship according to the reliability level information of the running object received by the receiving unit, where the first mapping relationship includes the identification information of the running object, the reliability level of the running object, and a data region in which data of the running object is stored, where the identification information, the reliability level, and the data region are in a one-to-one correspondence, and the second mapping relationship includes the identification information of the running object, the reliability level of the running object, and a CECR in which error-tolerant code corresponding to the data of the running object is stored, where the identification information, the reliability level, and the CECR are in a one-to-one correspondence, where the receiving unit is further configured to receive an access request sent by the processor, where the access request includes the identification information of the running object of the processor, physical address information of the data of the running object, and physical address information of the error-tolerant code of the running object, and an access unit configured to access the data of the running object according to the access request received by the receiving unit and the first mapping relationship, and access the error-tolerant code of the running object according to the access request and the second mapping relationship.

In a first possible implementation manner, with reference to the third aspect, the mapping relationship establishing unit is configured to query a preset correspondence table between the reliability level of the running object and the error-tolerant coding method according to the error-tolerant coding method in the reliability level information received by the receiving unit, so as to acquire the reliability level of the running object, query a preset correspondence table between the reliability level and the data region according to the reliability level of the running object to acquire the data region corresponding to the reliability level of the running object, and generate the first mapping relationship, and query a preset correspondence table between the reliability level and the CECR according to the reliability level of the running object to acquire the CECR corresponding to the reliability level of the running object, and generate the second mapping relationship.

In a second possible implementation manner, with reference to the third aspect or the first possible implementation manner, the receiving unit is configured to receive the access request sent by the processor, the access request includes a read access request, and correspondingly, the access unit includes a read access sub-request generating module configured to query the first mapping relationship according to the identification information of the running object to acquire the data region in which the data of the running object is stored, and generate a RD-d sub-request for the data region, where the RD-d sub-request includes the data region in which the data of the running object is stored and the physical address information of the data of the running object, and query the second mapping relationship according to the identification information of the running object to acquire the CECR in which the error-tolerant code of the running object is stored, and generate an error-tolerant RD-c sub-request for the CECR, where the RD-c sub-request includes the CECR in which the error-tolerant code of the running object is stored and the physical address information of the error-tolerant code of the object, a read module configured to acquire the data of the running object by searching, in the data region included in the RD-d sub-request that is generated by the read access sub-request generating module, for the physical address information of the data of the running object, and acquire the error-tolerant code of the running object by searching, in the CECR included in the RD-c sub-request that is generated by the read access sub-request generating module, for the physical address information of the error-tolerant code of the running object, a checking module configured to check, according to the error-tolerant code that is of the running object and read by the read module, the data that is of the running object and read by the read module, so as to acquire accurate data of the running object, and a sending module configured to send the accurate data of the running object to the processor, where the accurate data is obtained after the checking is performed by the checking module.

In a third possible implementation manner, with reference to the third aspect or the first possible implementation manner, the receiving unit is configured to receive the access request sent by the processor, the access request includes a write access request and data that needs to be written into the memory device, the write access request includes the identification information of the running object, physical address information of the data that needs to be written into the memory device, and physical address information of error-tolerant code of the data that needs to be written into the memory device, and correspondingly, the access unit includes: a write access sub-request generating module configured to query the first mapping relationship according to the identification information of the running object to acquire the data region in which the data of the running object is stored, and generate a data write access (WR-d) sub-request for the data region, where the WR-d sub-request includes the data region in which the data of the object is stored and the physical address information of the data that needs to be written into the memory device, and query the second mapping relationship according to the identification information of the running object to acquire the CECR corresponding to the running object, and generate an error-tolerant code write access (WR-c) sub-request for the CECR, where the WR-c sub-request includes the CECR in which the error-tolerant code of the object is stored and the physical address information of the error-tolerant code of the data that needs to be written into the memory device, an error-tolerant coding processing module configured to search the second mapping relationship using the identification information of the running object to obtain the error-tolerant coding method corresponding to the running object, perform, using the error-tolerant coding method corresponding to the object, error-tolerant coding processing on the data that needs to be written into the memory device, so as to acquire the error-tolerant code corresponding to the data that needs to be written into the memory device, and add, to a write request queue, the data that needs to be written into the memory device and the error-tolerant code corresponding to the data that needs to be written into the memory device, and a write module configured to acquire, by searching, in the data region included in the WR-d sub-request that is generated by the write access sub-request generating module, for the physical address information of the data that needs to be written into the memory device, a first physical address of the data that needs to be written into the memory device, and write, into the first physical address, the data that is in the write request queue and needs to be written into the memory device, and acquire, by searching, in the CECR included in the WR-c sub-request that is generated by the write access sub-request generating module, for the physical address information of the error-tolerant code of the data that needs to be written into the memory device, a second physical address of the error-tolerant code of the data that needs to be written into the memory device, and write, into the second physical address, the error-tolerant code that is in the write request queue and corresponds to the data that needs to be written into the memory device.

In a fourth possible implementation manner, with reference to any one of the third aspect and the first to the third possible implementation manners, the receiving unit is further configured to receive changed reliability level information sent by the processor, where the changed reliability level information includes the identification information of the running object and a new error-tolerant coding method that corresponds to a changed reliability level of the running object, and the mapping relationship establishing unit is further configured to query the preset correspondence table between the reliability level of the running object and the error-tolerant coding method according to the new error-tolerant coding method that is in the changed reliability level information received by the receiving unit and corresponds to the changed reliability level of the running object, and update the reliability level of the running object in the first mapping relationship and the second mapping relationship, query the preset correspondence table between the reliability level and the data region according to an updated reliability level of the running object in the first mapping relationship, and update the data region in the first mapping relationship, and query the preset correspondence table between the reliability level and the CECR according to the updated reliability level of the running object in the second mapping relationship, and update the CECR in the second mapping relationship.

According to a fourth aspect, an embodiment of the present disclosure provides a processor, including a setting unit configured to set a reliability level of a running object of the processor, where the reliability level of the running object represents a degree of a memory reliability requirement imposed by the running object, a querying unit configured to query a preset correspondence between the reliability level of the running object and an error-tolerant coding method to obtain an error-tolerant coding method corresponding to the reliability level of the running object, where the reliability level is set by the setting unit, and a sending unit configured to send reliability level information of the running object of the processor to a memory device, where the reliability level information is obtained by the querying unit, and the reliability level information includes identification information of the running object and the error-tolerant coding method that corresponds to the reliability level of the running object, where the sending unit is further configured to send an access request to the memory device, where the access request includes an identifier of the running object, physical address information of data of the running object, and physical address information of error-tolerant code of the running object.

In a first possible implementation manner, with reference to the fourth aspect, the processor further includes a changing unit configured to change the reliability level of the running object and obtain a new error-tolerant coding method that corresponds to a changed reliability level of the running object, where the sending unit is further configured to send changed reliability level information to the memory device, where the changed reliability level information is obtained by the changing unit, and the changed reliability level information includes the identification information of the running object and the new error-tolerant coding method that corresponds to the changed reliability level of the running object.

According to a fifth aspect, an embodiment of the present disclosure provides a memory device, including a memory chip, including a data region data region and a CECR, where the data region is used to store data of a running object of a processor, and the CECR is used to store error-tolerant code corresponding to the data of the running object, and a cache scheduler configured to receive reliability level information of the running object of the processor sent by the processor, where the reliability level information includes identification information of the running object and an error-tolerant coding method that corresponds to a reliability level of the running object, and the reliability level of the running object represents a degree of a memory reliability requirement imposed by the running object, establish a first mapping relationship and a second mapping relationship according to the reliability level information of the running object, where the first mapping relationship includes the identification information of the running object, the reliability level of the running object, and the data region in which the data of the running object is stored, where the identification information, the reliability level, and the data region are in a one-to-one correspondence, and the second mapping relationship includes the identification information of the running object, the reliability level of the running object, and the CECR in which the error-tolerant code corresponding to the data of the running object is stored, where the identification information, the reliability level, and the CECR are in a one-to-one correspondence, receive an access request sent by the processor, where the access request includes the identification information of the running object of the processor, physical address information of the data of the running object, and physical address information of the error-tolerant code of the running object, and access the data of the running object according to the access request and the first mapping relationship, and access, according to the access request and the second mapping relationship, the error-tolerant code corresponding to the running object.

In a first possible implementation manner, with reference to the fifth aspect, the cache scheduler is configured to query a preset correspondence table between the reliability level of the running object and the error-tolerant coding method according to the error-tolerant coding method in the reliability level information, so as to acquire the reliability level of the running object, query a preset correspondence table between the reliability level and the data region according to the reliability level of the running object to acquire the data region corresponding to the reliability level of the running object, and generate the first mapping relationship, and query a preset correspondence table between the reliability level and the CECR according to the reliability level of the running object to acquire the CECR corresponding to the reliability level of the running object, and generate the second mapping relationship.

In a second possible implementation manner, with reference to the fifth aspect or the first possible implementation manner, the cache scheduler receives the access request sent by the processor, the access request includes a read access request, and correspondingly, the cache scheduler is configured to query the first mapping relationship according to the identification information of the running object to acquire the data region in which the data of the running object is stored, and generate a RD-d sub-request for the data region, where the RD-d sub-request includes the data region in which the data of the running object is stored and the physical address information of the data of the running object, query the second mapping relationship according to the identification information of the running object to acquire the CECR in which the error-tolerant code of the running object is stored, and generate an error-tolerant RD-c sub-request for the CECR, where the RD-c sub-request includes the CECR in which the error-tolerant code of the running object is stored and the physical address information of the error-tolerant code of the object, and transmit the RD-d sub-request and the RD-c sub-request to the memory chip, the memory chip is configured to acquire the data of the running object by searching, in the data region included in the RD-d sub-request, for the physical address information of the data of the running object, acquire the error-tolerant code of the running object by searching, in the CECR included in the RD-c sub-request, for the physical address information of the error-tolerant code of the running object, and return the data and the error-tolerant code of the running object to the cache scheduler, and the cache scheduler is configured to check the data of the running object according to the error-tolerant code of the running object, so as to acquire accurate data of the running object, and send the accurate data of the running object to the processor, where the accurate data is obtained after the checking.

In a third possible implementation manner, with reference to the fifth aspect or the first possible implementation manner, the cache scheduler receives the access request sent by the processor, the access request includes a write access request and data that needs to be written into the memory device, the write access request includes the identification information of the running object, physical address information of the data that needs to be written into the memory device, and physical address information of error-tolerant code of the data that needs to be written into the memory device, and correspondingly, the cache scheduler is configured to query the first mapping relationship according to the identification information of the running object to acquire the data region in which the data of the running object is stored, and generate a WR-d sub-request for the data region, where the WR-d sub-request includes the data region in which the data of the object is stored and the physical address information of the data that needs to be written into the memory device, and query the second mapping relationship according to the identification information of the running object to acquire the CECR corresponding to the running object, and generate a WR-c sub-request for the CECR, where the WR-c sub-request includes the CECR in which the error-tolerant code of the object is stored and the physical address information of the error-tolerant code of the data that needs to be written into the memory device, search the second mapping relationship using the identification information of the running object to obtain the error-tolerant coding method corresponding to the running object, perform, using the error-tolerant coding method corresponding to the object, error-tolerant coding processing on the data that needs to be written into the memory device, so as to acquire the error-tolerant code corresponding to the data that needs to be written into the memory device, and add, to a write request queue, the data that needs to be written into the memory device and the error-tolerant code corresponding to the data that needs to be written into the memory device, and transmit the WR-d sub-request and the WR-c sub-request to the memory chip, and the memory chip is configured to acquire, by searching, in the data region included in the WR-d sub-request, for the physical address information of the data that needs to be written into the memory device, a first physical address of the data that needs to be written into the memory device, and write, into the first physical address, the data that is in the write request queue and needs to be written into the memory device, and acquire, by searching, in the CECR included in the WR-c sub-request, for the physical address information of the error-tolerant code of the data that needs to be written into the memory device, a second physical address of the error-tolerant code of the data that needs to be written into the memory device, and write, into the second physical address, the error-tolerant code that is in the write request queue and corresponds to the data that needs to be written into the memory device.

In a fourth possible implementation manner, with reference to any one of the fifth aspect and the first to the third possible implementation manners, the cache scheduler is further configured to receive changed reliability level information sent by the processor, where the changed reliability level information includes the identification information of the running object and a new error-tolerant coding method that corresponds to a changed reliability level of the running object, query the preset correspondence table between the reliability level of the running object and the error-tolerant coding method according to the new error-tolerant coding method that is in the changed reliability level information and corresponds to the changed reliability level of the running object, and update the reliability level of the running object in the first mapping relationship and the second mapping relationship, query the preset correspondence table between the reliability level and the data region according to an updated reliability level of the running object in the first mapping relationship, and update the data region in the first mapping relationship, and query the preset correspondence table between the reliability level and the CECR according to the updated reliability level of the running object in the second mapping relationship, and update the CECR in the second mapping relationship.

According to a sixth aspect, an embodiment of the present disclosure provides a processor, including a processor core configured to set a reliability level of a running object of the processor, where the reliability level of the running object represents a degree of a memory reliability requirement imposed by the running object, query a preset correspondence between the reliability level of the running object and an error-tolerant coding method to obtain an error-tolerant coding method corresponding to the reliability level of the running object, and send reliability level information of the running object of the processor to a memory device, where the reliability level information includes identification information of the running object and the error-tolerant coding method that corresponds to the reliability level of the running object, and send an access request to the memory device, where the access request includes an identifier of the running object, physical address information of data of the running object, and physical address information of error-tolerant code of the running object.

In a first possible implementation manner, with reference to the sixth aspect, the processor core is further configured to change the reliability level of the running object and obtain a new error-tolerant coding method that corresponds to a changed reliability level of the running object, and send changed reliability level information to the memory device, where the changed reliability level information includes the identification information of the running object and the new error-tolerant coding method that corresponds to the changed reliability level of the running object.

According to a seventh aspect, an embodiment of the present disclosure provides a memory access system, including the memory device according to any one of the third aspect or the fifth aspect, and the processor according to any one of the fourth aspect or the sixth aspect.

According to the memory access method, device, and system provided in the embodiments of the present disclosure, a memory device establishes a first mapping relationship and a second mapping relationship according to reliability level information of a running object sent by a processor, and separately accesses data and error-tolerant code of the running object according to the first mapping relationship, the second mapping relationship, and an access request that is sent by the processor. In this way, a hierarchical and flexible method for setting a memory reliability level is provided to implement a memory access mechanism for different running object types and different reliability levels.

BRIEF DESCRIPTION OF DRAWINGS

To describe the technical solutions in the embodiments of the present disclosure more clearly, the following briefly introduces the accompanying drawings for describing the embodiments. The accompanying drawings in the following description show merely some embodiments of the present disclosure, and persons of ordinary skill in the art may still derive other drawings from these accompanying drawings without creative efforts.

FIG. 2 is a flowchart of another memory access method according to an embodiment of the present disclosure;

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by persons of ordinary skill in the art based on the embodiments of the present disclosure without creative efforts shall fall within the protection scope of the present disclosure.

Figure 1:
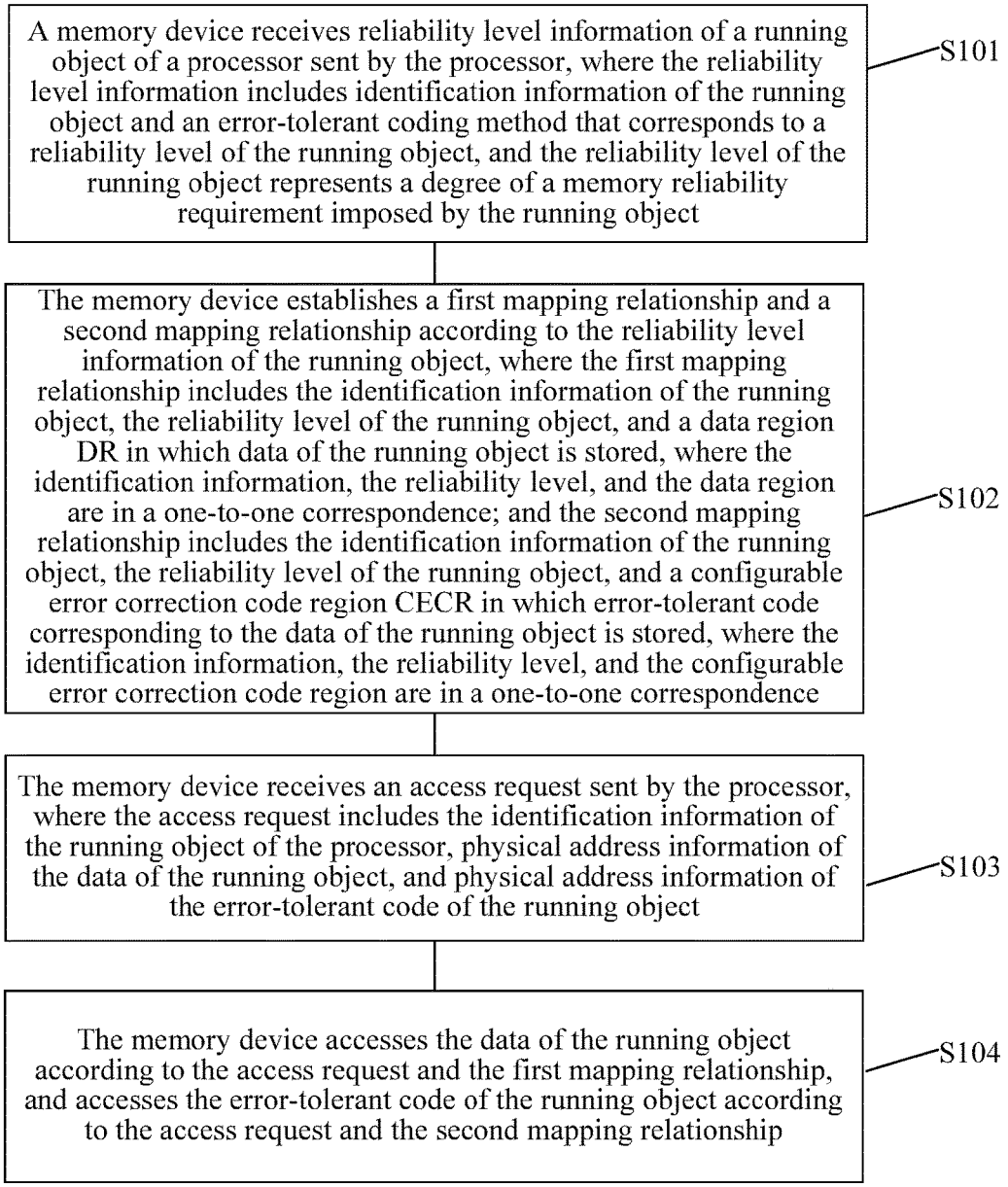
FIG. 1 is a flowchart of a memory access method according to an embodiment of the present disclosure.

An embodiment of the present disclosure provides a memory access method. Referring to FIG. 1, the method includes the following steps.

Step S101: A memory device receives reliability level information of a running object of a processor sent by the processor, where the reliability level information includes identification information of the running object and an error-tolerant coding method that corresponds to a reliability level of the running object, and the reliability level of the running object represents a degree of a memory reliability requirement imposed by the running object.

Step S102: The memory device establishes a first mapping relationship and a second mapping relationship according to the reliability level information of the running object, where the first mapping relationship includes the identification information of the running object, the reliability level of the running object, and a data region in which data of the running object is stored, where the identification information, the reliability level, and the data region are in a one-to-one correspondence; and the second mapping relationship includes the identification information of the running object, the reliability level of the running object, and a CECR in which error-tolerant code corresponding to the data of the running object is stored, where the identification information, the reliability level, and the CECR are in a one-to-one correspondence.

Exemplarily, that the memory device establishes the first mapping relationship and the second mapping relationship according to the reliability level information of the running object includes the memory device queries a preset correspondence table between the reliability level of the running object and the error-tolerant coding method according to the error-tolerant coding method in the reliability level information, so as to acquire the reliability level of the running object, the memory device queries a preset correspondence table between the reliability level and the data region according to the reliability level of the running object to acquire the data region corresponding to the reliability level of the running object, and generates the first mapping relationship, and the memory device queries a preset correspondence table between the reliability level and the CECR according to the reliability level of the running object to acquire the CECR corresponding to the reliability level of the running object, and generates the second mapping relationship.

Exemplarily, the method may further include that the memory device receives changed reliability level information sent by the processor, where the changed reliability level information includes the identification information of the running object and a new error-tolerant coding method that corresponds to a changed reliability level of the running object, the memory device queries the preset correspondence table between the reliability level of the running object and the error-tolerant coding method according to the new error-tolerant coding method that is in the changed reliability level information and corresponds to the changed reliability level of the running object, and updates the reliability level of the running object in the first mapping relationship and the second mapping relationship, the memory device queries the preset correspondence table between the reliability level and the data region according to an updated reliability level of the running object in the first mapping relationship, and updates the data region in the first mapping relationship, and the memory device queries the preset correspondence table between the reliability level and the CECR according to the updated reliability level of the running object in the second mapping relationship, and updates the CECR in the second mapping relationship.

Step S103: The memory device receives an access request sent by the processor, where the access request includes the identification information of the running object of the processor, physical address information of the data of the running object, and physical address information of the error-tolerant code corresponding to the data of the running object.

Step S104: The memory device accesses the data of the running object according to the access request and the first mapping relationship, and accesses the error-tolerant code of the running object according to the access request and the second mapping relationship.

Exemplarily, the memory device receives the access request sent by the processor, the access request includes a read access request, and correspondingly, the memory device accesses the data of the running object according to the access request and the first mapping relationship. Accessing the error-tolerant code of the running object according to the access request and the second mapping relationship includes the memory device queries the first mapping relationship according to the identification information of the running object to acquire the data region in which the data of the running object is stored, and generates a RD-d sub-request for the data region, where the RD-d sub-request includes the data region in which the data of the running object is stored and the physical address information of the data of the running object, and queries the second mapping relationship according to the identification information of the running object to acquire the CECR in which the error-tolerant code of the running object is stored, and generates an error-tolerant RD-c sub-request for the CECR, where the RD-c sub-request includes the CECR in which the error-tolerant code of the running object is stored and the physical address information of the error-tolerant code of the object.

The memory device acquires the data of the running object by searching, in the data region included in the RD-d sub-request, for the physical address information of the data of the running object, and acquires the error-tolerant code of the running object by searching, in the CECR included in the RD-c sub-request, for the physical address information of the error-tolerant code of the running object. The memory device checks the data of the running object according to the error-tolerant code of the running object, so as to acquire accurate data of the running object. The memory device sends the accurate data of the running object to the processor, where the accurate data is obtained after the checking.

Exemplarily, the memory device receives the access request sent by the processor, where the access request includes a write access request and data that needs to be written into the memory device, the write access request includes the identification information of the running object, physical address information of the data that needs to be written into the memory device, and physical address information of error-tolerant code of the data that needs to be written into the memory device, and correspondingly, the memory device accesses the data of the running object according to the access request and the first mapping relationship, and accesses the error-tolerant code of the running object according to the access request and the second mapping relationship includes the memory device queries the first mapping relationship according to the identification information of the running object to acquire the data region in which the data of the running object is stored, and generates a WR-d sub-request for the data region, where the WR-d sub-request includes the data region in which the data of the object is stored and the physical address information of the data that needs to be written into the memory device, and queries the second mapping relationship according to the identification information of the running object to acquire the CECR corresponding to the running object, and generates a WR-c sub-request for the CECR, where the WR-c sub-request includes the CECR in which the error-tolerant code of the object is stored and the physical address information of the error-tolerant code of the data that needs to be written into the memory device.

The memory device searches the second mapping relationship using the identification information of the running object to obtain the error-tolerant coding method corresponding to the running object, performs, using the error-tolerant coding method corresponding to the object, error-tolerant coding processing on the data that needs to be written into the memory device, so as to acquire the error-tolerant code corresponding to the data that needs to be written into the memory device, and adds, to a write request queue, the data that needs to be written into the memory device and the error-tolerant code corresponding to the data that needs to be written into the memory device.

The memory device acquires, by searching, in the data region included in the WR-d sub-request, for the physical address information of the data that needs to be written into the memory device, a first physical address of the data that needs to be written into the memory device, and writes, into the first physical address, the data that is in the write request queue and needs to be written into the memory device; and acquires, by searching, in the CECR included in the WR-c sub-request, for the physical address information of the error-tolerant code of the data that needs to be written into the memory device, a second physical address of the error-tolerant code of the data that needs to be written into the memory device, and writes, into the second physical address, the error-tolerant code that is in the write request queue and corresponds to the data that needs to be written into the memory device.

According to the memory access method provided in this embodiment of the present disclosure, a memory device establishes a first mapping relationship and a second mapping relationship according to reliability level information of a running object sent by a processor, and separately accesses data and error-tolerant code of the running object according to the first mapping relationship, the second mapping relationship, and an access request that is sent by the processor. In this way, a hierarchical and flexible method for setting a memory reliability level is provided to implement a memory access mechanism for different running object types and different reliability levels.

An embodiment of the present disclosure provides a memory access method. Referring to FIG. 2, the method includes the following steps.

Step S201: A processor sets a reliability level of a running object of the processor, where the reliability level of the running object represents a degree of a memory reliability requirement imposed by the running object.

Step S202: The processor queries a preset correspondence table between the reliability level of the running object and an error-tolerant coding method to obtain an error-tolerant coding method corresponding to the reliability level of the running object, and sends reliability level information of the running object of the processor to a memory device. The reliability level information includes identification information of the running object and the error-tolerant coding method that corresponds to the reliability level of the running object so that the memory device establishes a first mapping relationship and a second mapping relationship according to the reliability level information of the running object. The first mapping relationship includes the identification information of the running object, the reliability level of the running object, and a data region data region in which data of the running object is stored, where the identification information, the reliability level, and the data region are in a one-to-one correspondence. The second mapping relationship includes the identification information of the running object, the reliability level of the running object, and a CECR in which error-tolerant code corresponding to the data of the running object is stored, where the identification information, the reliability level, and the CECR are in a one-to-one correspondence.

Exemplarily, the method may further include that the processor changes the reliability level of the running object and obtains a new error-tolerant coding method that corresponds to a changed reliability level of the running object, and the processor sends changed reliability level information to the memory device. The changed reliability level information includes the identification information of the running object and the new error-tolerant coding method that corresponds to the changed reliability level of the running object so that the memory device queries the preset correspondence table between the reliability level of the running object and the error-tolerant coding method according to the new error-tolerant coding method that is in the changed reliability level information and corresponds to the changed reliability level of the running object, and updates the reliability level of the running object in the first mapping relationship and the second mapping relationship. The memory device further queries a preset correspondence table between the reliability level and the data region according to an updated reliability level of the running object in the first mapping relationship, and updates the data region in the first mapping relationship. The memory device further queries a preset correspondence table between the reliability level and the CECR according to the updated reliability level of the running object in the second mapping relationship, and updates the CECR in the second mapping relationship.

Step S203: The processor sends an access request to the memory device, where the access request includes an identifier of the running object, physical address information of the data of the running object, and physical address information of the error-tolerant code of the running object so that the memory device accesses the data of the running object according to the access request and the first mapping relationship, and accesses the error-tolerant code of the running object according to the access request and the second mapping relationship.

According to the memory access method provided in this embodiment of the present disclosure, a memory device establishes a first mapping relationship and a second mapping relationship according to reliability level information of a running object sent by a processor, and separately accesses data and error-tolerant code of the running object according to the first mapping relationship, the second mapping relationship, and an access request that is sent by the processor. In this way, a hierarchical and flexible method for setting a memory reliability level is provided to implement a memory access mechanism for different running object types and different reliability levels.

Figure 3:
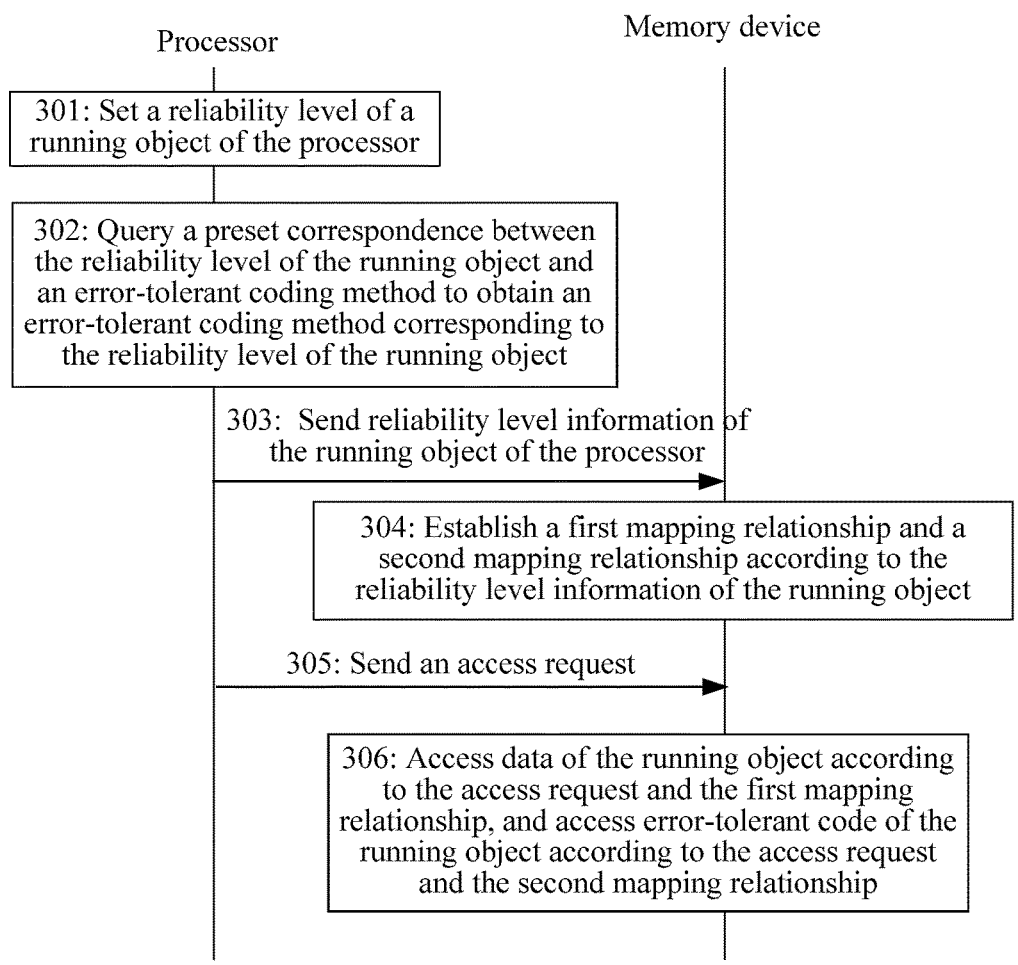
FIG. 3 is a flowchart of a detailed embodiment of a memory access method.

FIG. 3 is a detailed embodiment of a memory access method. It should be noted that in this embodiment of the present disclosure, a principle is described using a process as a running object of a processor. However, this does not indicate that this embodiment of the present disclosure is only applicable to a case in which a process is used as a running object of a processor. Because processes have different memory reliability requirements, different processes may have different reliability levels, and may also correspond to different error-tolerant coding methods. It may be understood that this embodiment of the present disclosure may also be applied to a running object of another granularity size, for example, a thread or a code segment, and running objects of different granularity sizes may also correspond to different reliability levels. Specific implementation steps of this embodiment include the following steps:

Step 301: A processor sets a reliability level of a running object of the processor.

Exemplarily, the reliability level of the running object represents a degree of a memory reliability requirement imposed by the running object.

Exemplarily, in this embodiment of the present disclosure, the processor may set a reliability level of a process App j when initially scheduling and starting to run the process App j. Furthermore, a basis for setting the reliability level may include one or more of user definition, operating system setting, memory chip fault information, current operating mode, and the like, which is not limited in this embodiment of the present disclosure.

For convenience of description, different reliability levels may correspond to different error-tolerant coding methods. In this embodiment of the present disclosure, there are four different reliability levels, which correspond to different error-tolerant coding methods in a one-to-one manner according to a preset correspondence between a reliability level and an error-tolerant coding method, as shown in Table 1.

The processor may set the reliability level of the process App j to Level 3, and an error-tolerant coding method corresponding to Level 3 is BCH coding.

TABLE 1

| Reliability level | Error-tolerant coding method |
| --- | --- |
| Level 1 | SEC-DED |
| Level 2 | Chipkill |
| Level 3 | BCH |
| Level 4 | MIRROR |

Exemplarily, the processor may further store the reliability level of the process App j after setting the reliability level of the App j. For example, the processor may write the error-tolerant coding method corresponding to the reliability level of App j into a reliability-level register (RLR), where one process corresponds to one RLR. It should be noted that in this embodiment an RLR is a register that corresponds to a process and is used to store and read an error-tolerant coding method corresponding to a reliability level of the process; and the RLR may be disposed inside the processor, or may be connected to the processor using an address bus. This embodiment of the present disclosure does not impose any limitation to a specific implementation form of the RLR.

Step 302: The processor queries a preset correspondence between the reliability level of the running object and an error-tolerant coding method to obtain an error-tolerant coding method corresponding to the reliability level of the running object.

Exemplarily, reliability level information includes identification information of the running object and the error-tolerant coding method that corresponds to the reliability level of the running object.

The processor may obtain, by querying Table 1, the error-tolerant coding method corresponding to the reliability level of App j, and store the error-tolerant coding method in an RLR corresponding to App j. For example, the reliability level of App j is Level 3, which corresponds to BCH coding.

Then, the processor sends to a memory device, the error-tolerant coding method that corresponds to App j and is read from the RLR corresponding to App j. Furthermore, the processor may obtain reliability level information of App j using identification information of App j and the error-tolerant coding method that corresponds to the reliability level of App j.

Step 303: The processor sends reliability level information of the running object of the processor to a memory device.

Step 304: The memory device receives the reliability level information of the running object of the processor sent by the processor, and establishes a first mapping relationship and a second mapping relationship according to the reliability level information of the running object.

Exemplarily, the memory device establishes the first mapping relationship and the second mapping relationship according to the reliability level information of the running object may include the memory device queries a preset correspondence table, as shown in Table 1, between the reliability level of the running object and the error-tolerant coding method according to the error-tolerant coding method in the reliability level information, so as to acquire the reliability level of the running object, the memory device queries a preset correspondence table between the reliability level and a data region according to the reliability level of the running object to acquire the data region corresponding to the reliability level of the running object, and generates the first mapping relationship, and the memory device queries a preset correspondence table between the reliability level and a CECR according to the reliability level of the running object to acquire the CECR corresponding to the reliability level of the running object, and generates the second mapping relationship.

The first mapping relationship includes the identification information of the running object, the reliability level of the running object, and a data region in which data of the running object is stored, where the identification information, the reliability level, and the data region are in a one-to-one correspondence, and the second mapping relationship includes the identification information of the running object, the reliability level of the running object, and a CECR in which error-tolerant code corresponding to the data of the running object is stored, where the identification information, the reliability level, and the CECR are in a one-to-one correspondence.

Figure 4:
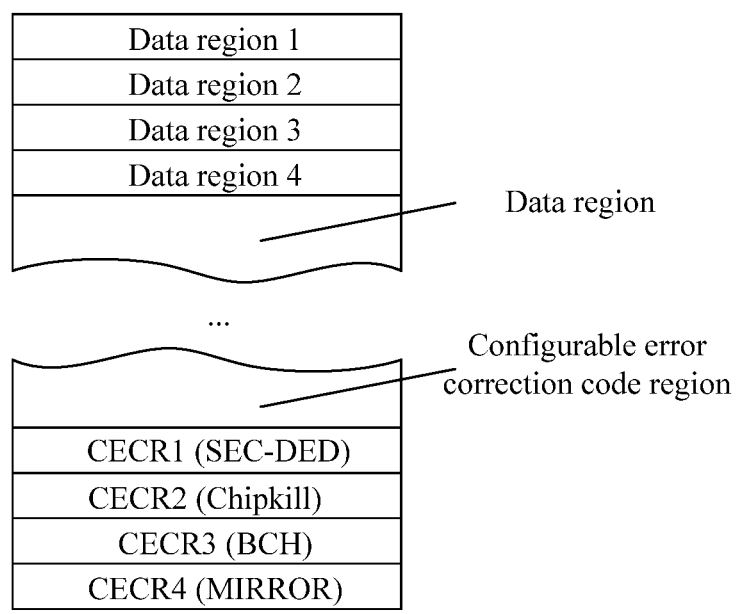
FIG. 4 is a schematic diagram of memory region division.

In this embodiment of the present disclosure, the first mapping relationship and the second mapping relationship may represent, in a form of a query table, identification information of the process, a reliability level, a data region in which data of the process is stored, and a CECR in which error-tolerant code corresponding to the data of the process is stored, where the identification information, the reliability level, the data region, and the CECR are in a one-to-one correspondence; however, the present disclosure is not limited thereto. With reference to a schematic diagram of memory regions shown in FIG. 4, for a data region 3 in which data of App j is stored and a CECR 3 in which the error-tolerant code corresponding to the data of the process is stored, a form of a query table may be an address mapping table (AMT). Referring to Table 2, Table 2 is an AMT in this embodiment of the present disclosure, and includes a process number, a reliability level of a process, a data region in which data of the process is stored, and a CECR in which error-tolerant code corresponding to the data of the process is stored.

In this embodiment of the present disclosure, after receiving the reliability level information of App j sent by the processor, the memory device may query a preset correspondence table, as shown in Table 1, between the reliability level of the process and the error-tolerant coding method according to the error-tolerant coding method, for example, BCH coding, of App j in the reliability level information to obtain the reliability level, Level 3, of App J.

The memory device may query a preset correspondence table between the reliability level and the data region to acquire that a data region corresponding to the reliability level, Level 3, of App j is the data region 3, and establish the first mapping relationship accordingly. Preferably, the first mapping relationship may indicate that the data of App j is mapped to the data region 3.

The memory device may query a preset correspondence table between the reliability level and the CECR to acquire that a CECR corresponding to the reliability level, Level 3, of App j is the CECR 3, and establish the second mapping relationship accordingly. Preferably, the second mapping relationship may indicate that code of App j is mapped to the CECR 3.

Afterward, the memory device adds, to the AMT shown in Table 2, the identification information of the process App j The identification information includes, for example, the process number, the reliability level, Level 3, of App j, the data region 3 in which the data of App j is stored, and the CECR 3 in which the error-tolerant code corresponding to the data of App j is stored. In this embodiment of the present disclosure, the AMT table may be managed and maintained by a cache scheduler in the memory device.

TABLE 2

| Process number | Reliability level | Data mapping | Code mapping |
|---|---|---|---|
| App i | Level 1 | data region1 | CECR1 |
| App j | Level 3 | data region3 | CECR3 |

Exemplarily, in this embodiment, after the memory device establishes the first mapping relationship and the second mapping relationship according to the reliability level information of the running object, the memory device may store the data of the process App j into the data region 3 according to an entry of the process App j in the AMT, and after performing error-tolerant coding on the data of App j by means of BCH coding, writes an obtained code word into the CECR 3.

Further, if there is no data region 3 and/or CECR 3 in memory, the memory device may allocate a corresponding data region and CECR to App j according to the first mapping relationship and the second mapping relationship.

The memory device may allocate two regions, that is, the data region 3 and the CECR 3, in the memory to App j according to the AMT, and stores the data of the process App j into the data region 3 according to the entry of the process App j in the AMT, and after performing error-tolerant coding on the data of the App j by means of BCH coding, writes an obtained code word into the CECR 3.

In this case, the first mapping relationship and the second mapping relationship of the process App j are established. In a subsequent running process of the process App j, the processor may reliably access the memory according to the two mapping relationships of App j. A exemplary access process is as follows.

Step 305: The processor sends an access request to the memory device.

Exemplarily, the access request includes the identification information of the running object of the processor, physical address information of the data of the running object, and physical address information of the error-tolerant code of the running object.

In this embodiment, in a process of running App j, the access request sent by the processor includes a process number of App j, physical address information of the data of App j, and physical address information of error-tolerant code of App j. In addition, the access request may include a read access request and a write access request. When a type of the access request is a write access request, the processor sends, to the memory device, data that App j needs to write into the memory device.

Step 306: The memory device accesses the data of the running object according to the access request and the first mapping relationship, and accesses the error-tolerant code of the running object according to the access request and the second mapping relationship.

Figure 5:
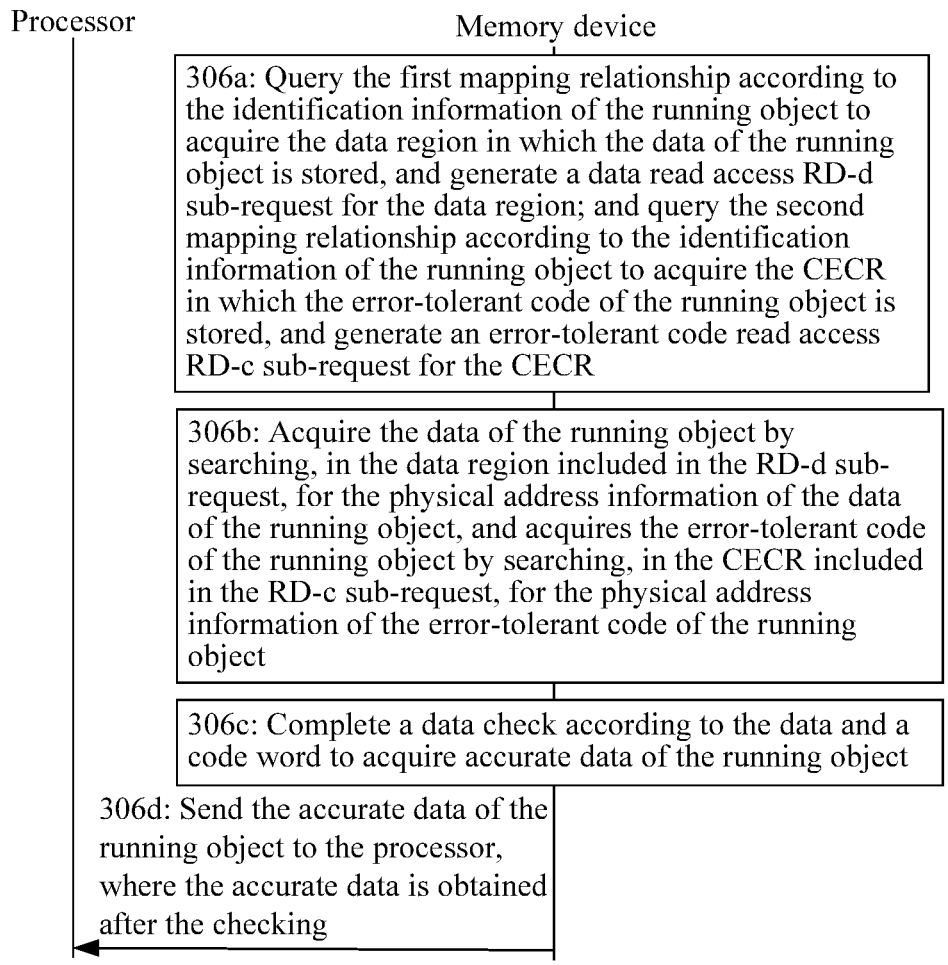
FIG. 5 is a schematic diagram of detailed read access steps of step 306 in a detailed embodiment.

Exemplarily, when the access request is a read access request, as shown in FIG. 5, step 306 may include the following steps.

Step 306a: The memory device queries the first mapping relationship according to the identification information of the running object to acquire the data region in which the data of the running object is stored, and generates a RD-d sub-request for the data region, and queries the second mapping relationship according to the identification information of the running object to acquire the CECR in which the error-tolerant code of the running object is stored, and generates an error-tolerant RD-c sub-request for the CECR.

Exemplarily, the RD-d sub-request includes the data region in which the data of the running object is stored and the physical address information of the data of the running object, and the RD-c sub-request includes the CECR in which the error-tolerant code of the running object is stored and the physical address information of the error-tolerant code of the object.

In this embodiment, the memory device may query the AMT according to the process number in the read access request to obtain the data region 3 in which the data of the process App j is stored and the CECR 3 in which the error-tolerant code is stored, and generates a RD-d sub-request for reading the data region 3 and a RD-c sub-request for reading the CECR 3, where the RD-d sub-request includes the data region 3 and the physical address information of the data of App j, and the RD-c sub-request includes the CECR 3 and the physical address information of the error-tolerant code of App j.

Step 306b: The memory device acquires the data of the running object by searching, in the data region included in the RD-d sub-request, for the physical address information of the data of the running object, and acquires the error-tolerant code of the running object by searching, in the CECR included in the RD-c sub-request, for the physical address information of the error-tolerant code of the running object.

In this embodiment, the memory device may convert the two read access sub-requests into a series of commands that meet a memory chip standard, and sends the commands to a memory chip so that the memory chip may acquire the data of App j by searching, in the data region included in the RD-d sub-request, for the physical address information of the data of App j, and acquires the error-tolerant code of App j by searching, in the CECR included in the RD-c sub-request, for the physical address information of the error-tolerant code of App j, and transmits the data and the error-tolerant code of App j to the memory device.

Step 306c: The memory device completes a data check according to the data and a code word to acquire accurate data of the running object.

In this embodiment, after receiving the data and the code word that are returned by the memory chip according to the two read access sub-requests, the memory device checks the data using the error-tolerant coding method BCH coding corresponding to the reliability level, Level 3, of App j, and after the check is successful, returns the data to the processor to execute step 306d. If the check is unsuccessful, persons skilled in the art may understand that the memory device will report an error, interrupt an access process, and return error information to the processor for processing.

Step 306d: The memory device sends the accurate data of the running object to the processor, where the accurate data is obtained after the checking.

Figure 6:
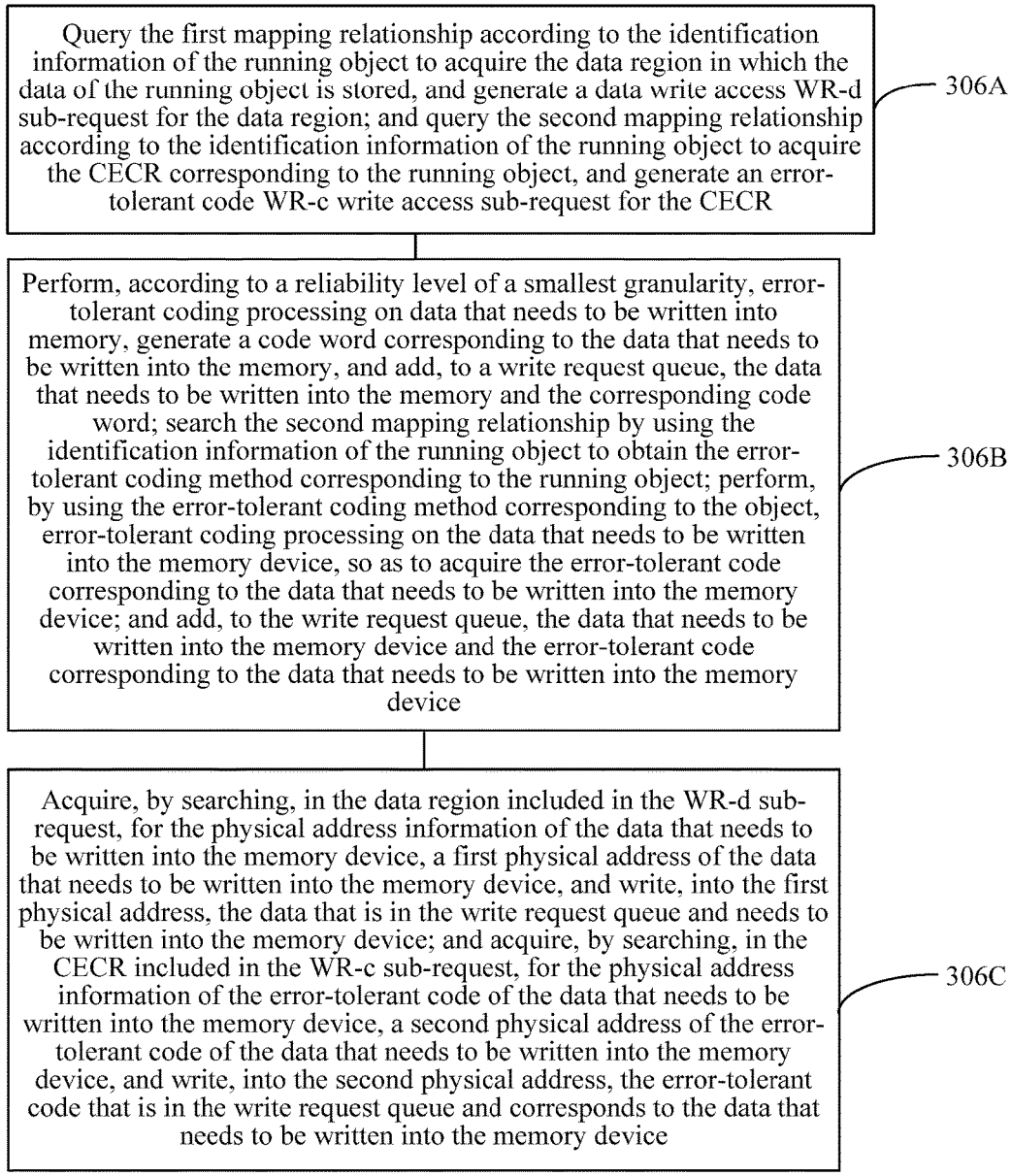
FIG. 6 is a schematic diagram of detailed write access steps of step 306 in a detailed embodiment.

Exemplarily, when the type of the access request is a write access request, the write access request includes the identification information of the running object, physical address information of data that needs to be written into the memory device, and physical address information of error-tolerant code of the data that needs to be written into the memory device. As shown in FIG. 6, step 306 may include the following steps.

Step 306A: The memory device queries the first mapping relationship according to the identification information of the running object to acquire the data region in which the data of the running object is stored, and generates a WR-d sub-request for the data region, and queries the second mapping relationship according to the identification information of the running object to acquire the CECR corresponding to the running object, and generates a WR-c sub-request for the CECR.

Exemplarily, the WR-d sub-request includes the data region in which the data of the object is stored and the physical address information of the data that needs to be written into the memory device, and the WR-c sub-request includes the CECR in which the error-tolerant code of the object is stored and the physical address information of the error-tolerant code of the data that needs to be written into the memory device.

In this embodiment, the memory device may query the AMT according to the process number in the write access request to obtain the data region 3 in which the data of App j is stored and the CECR 3 in which the error-tolerant code is stored, and generates a WR-d sub-request for writing data into the data region 3 and a WR-c sub-request for writing into the CECR 3, where the WR-d sub-request includes the data region 3 and the physical address information of the data that needs to be written into the memory device, and the WR-c sub-request includes the CECR 3 and the physical address information of the error-tolerant code of the data that needs to be written into the memory device.

Step 306B: The memory device searches the second mapping relationship using the identification information of the running object to obtain the error-tolerant coding method corresponding to the running object, performs, using the error-tolerant coding method corresponding to the object, error-tolerant coding processing on the data that needs to be written into the memory device so as to acquire the error-tolerant code corresponding to the data that needs to be written into the memory device, and adds, to a write request queue, the data that needs to be written into the memory device and the error-tolerant code corresponding to the data that needs to be written into the memory device.

In this embodiment, the memory device may obtain the error-tolerant coding method BCH coding corresponding to the reliability level, Level 3, of App j by querying the AMT, generate, according to the error-tolerant coding method, a code word for the data that needs to be written into memory device, and then add, to the write request queue, the data that needs to be written into the memory and the code word.

Step 306C: The memory device acquires, by searching in the data region included in the WR-d sub-request for the physical address information of the data that needs to be written into the memory device, a first physical address of the data that needs to be written into the memory device, and writes, into the first physical address, the data that is in the write request queue and needs to be written into the memory device. The memory device further acquires, by searching in the CECR included in the WR-c sub-request for the physical address information of the error-tolerant code of the data that needs to be written into the memory device, a second physical address of the error-tolerant code of the data that needs to be written into the memory device, and writes, into the second physical address, the error-tolerant code that is in the write request queue and corresponds to the data that needs to be written into the memory device.

In this embodiment, the memory device converts the two write access requests into a series of commands that meet a memory chip standard, and sends the commands to a memory chip so that the memory chip respectively writes, into the first physical address and the second physical address, the data that needs to be written into the memory device and the error-tolerant code of the data that needs to be written into the memory device, where the data that needs to be written into the memory device and the error-tolerant code are in the write request queue.

Figure 7:
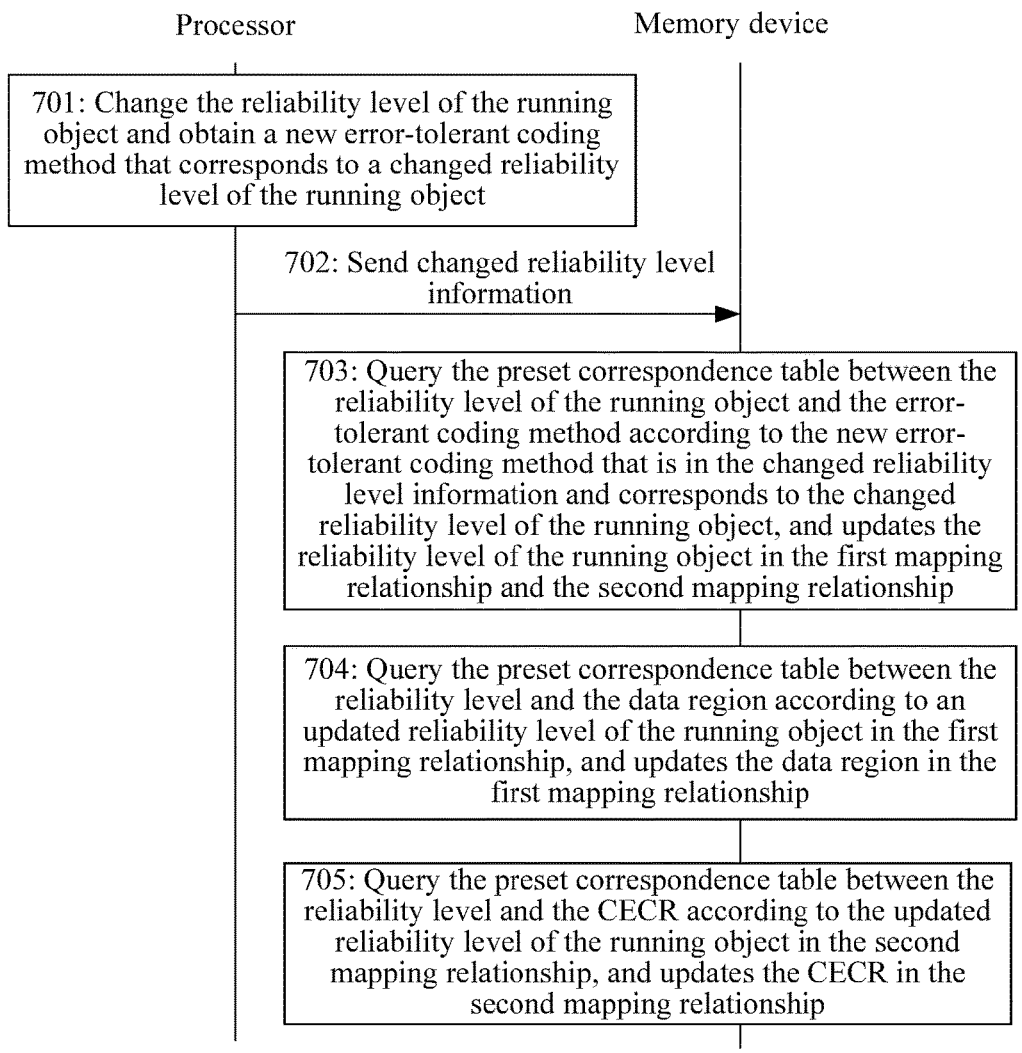
FIG. 7 is a schematic diagram of a process of adjusting a reliability level in a detailed embodiment.

In addition, in a running process of the running object, the reliability level of the running object may further be adjusted. In this embodiment, in a running process of the process App j, the reliability level of the process App j may further be adjusted. As shown in FIG. 7, a specific adjustment process is as follows.

Step 701: The processor changes the reliability level of the running object and obtains a new error-tolerant coding method that corresponds to a changed reliability level of the running object.

Exemplarily, in this embodiment, the processor may adjust the reliability level of the process App j according to a change in one or more items of a basis for setting the reliability level. Moreover, the processor first performs interrupt processing on the running process App j before the adjustment.

For example, in this embodiment of the present disclosure, the reliability level of the process App j is adjusted from Level 3 to Level 4. In this case, by querying Table 1, it may be learned that the error-tolerant coding method of the process App j is changed from BCH coding to MIRROR coding.

Preferably, the processor may change the error-tolerant coding method in the RLR corresponding to the process App j to MIRROR coding.

Step 702: The processor sends changed reliability level information to the memory device.

Exemplarily, the changed reliability level information includes the identification information of the running object and the new error-tolerant coding method that corresponds to the changed reliability level of the running object.

In this embodiment, the processor may read the changed error-tolerant coding method MIRROR in the RLR corresponding to the process App j, where the changed error-tolerant coding method MIRROR and the process number of the process App j form the changed reliability level information, and send the changed reliability level information to the memory device.

Step 703: The memory device queries the preset correspondence table between the reliability level of the running object and the error-tolerant coding method according to the new error-tolerant coding method that is in the changed reliability level information and corresponds to the changed reliability level of the running object. The memory device then updates the reliability level of the running object in the first mapping relationship and the second mapping relationship.

Exemplarily, in this embodiment, the memory device may query the preset correspondence table between the reliability level of the process and the error-tolerant coding method according to the new error-tolerant coding method MIRROR of the process App j, so as to obtain a new reliability level, Level 4, of App j.

Step 704: The memory device queries the preset correspondence table between the reliability level and the data region according to an updated reliability level of the running object in the first mapping relationship, and updates the data region in the first mapping relationship.

Exemplarily, in this embodiment, the memory device may query the preset correspondence table between the reliability level and the data region to acquire a data region corresponding to the new reliability level, Level 4, of App j. It should be noted that whether a change of the data region corresponding to App j involves only migration in the data region of the data corresponding to App j has no direct relationship to a change of the reliability level. For convenience of description, it is assumed that the data region of App j does not change and may still be the data region 3 so that an updated first mapping relationship may indicate that the data of App j is mapped to the data region 3; however, the present disclosure is not limited thereto.

Step 705: The memory device queries the preset correspondence table between the reliability level and the CECR according to the updated reliability level of the running object in the second mapping relationship, and updates the CECR in the second mapping relationship.

Exemplarily, the memory device may query the preset correspondence table between the reliability level and the CECR to acquire that a CECR corresponding to the new reliability level, Level 4, of App j is a CECR 4, and updates the second mapping relationship accordingly. Preferably, an updated second mapping relationship may indicate that code of App j is mapped to the CECR 4.

Further, in this embodiment, the memory device may change the entry of the process number App j in the AMT to the process number App j, a changed reliability level, Level 4, of App j, the data region 3 in which the data of App j is stored, and the CECR 4 in which new error-tolerant code corresponding to the data of App j is stored, as shown in Table 3.

TABLE 3

| Process number | Reliability level | Data mapping | Code mapping |
|---|---|---|---|
| App i | Level 1 | data region1 | CECR1 |
| App j | Level 4 | data region3 | CECR4 |

Exemplarily, in this embodiment, after updating the data region in the first mapping relationship and the CECR in the second mapping relationship, the memory device may migrate, according to the changed AMT shown in Table 3, the data of App j to a data region of the App j shown in Table 3, obtains new error-tolerant code for the data of App j according to the new error-tolerant coding method MIRROR corresponding to the data of App j, and migrates the new error-tolerant code of App j to the CECR 4.

Further, after step 705 is completed, the processor recovers from the interrupt so as to continue to run the process App j, and subsequently, may access data according to the changed reliability level of App j. For an access process, refer to the foregoing step 305 to step 306, which is not described herein again.

According to the memory access method provided in this embodiment of the present disclosure, a memory device establishes a first mapping relationship and a second mapping relationship according to reliability level information of a running object sent by a processor, and separately accesses data and error-tolerant code of the running object according to the first mapping relationship, the second mapping relationship, and an access request that is sent by the processor. In this way, a hierarchical and flexible method for setting a memory reliability level is provided to implement a memory access mechanism for different running object types and different reliability levels.

Figure 8:
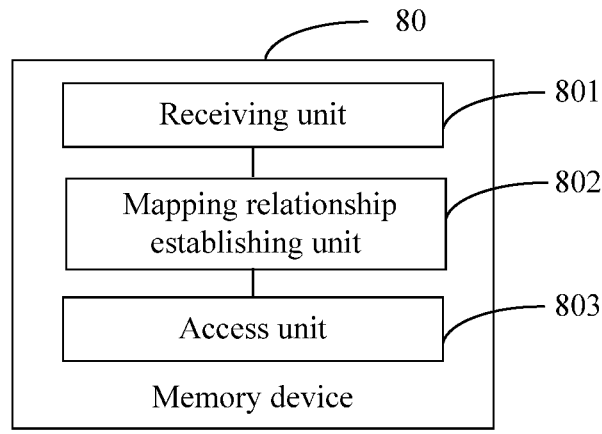
FIG. 8 is a schematic structure diagram of a memory device according to an embodiment of the present disclosure.

An embodiment of the present disclosure provides a memory device 80. Referring to FIG. 8, the memory device includes the following.

A receiving unit 801 configured to receive reliability level information of a running object of a processor sent by the processor. The reliability level information includes identification information of the running object and an error-tolerant coding method that corresponds to a reliability level of the running object. The reliability level of the running object represents a degree of a memory reliability requirement imposed by the running object.

A mapping relationship establishing unit 802 configured to establish a first mapping relationship and a second mapping relationship according to the reliability level information of the running object received by the receiving unit 801. The first mapping relationship includes the identification information of the running object, the reliability level of the running object, and a data region data region in which data of the running object is stored, and the identification information, the reliability level, and the data region are in a one-to-one correspondence. The second mapping relationship includes the identification information of the running object, the reliability level of the running object, and a CECR in which error-tolerant code corresponding to the data of the running object is stored, and the identification information, the reliability level, and the CECR are in a one-to-one correspondence.

The receiving unit 801 is further configured to receive an access request sent by the processor, where the access request includes the identification information of the running object of the processor, physical address information of the data of the running object, and physical address information of the error-tolerant code of the running object.

In this embodiment, in a process of running App j, the access request sent by the processor includes a process number of App j, physical address information of data of App j, and physical address information of error-tolerant code of App j. In addition, the access request may include a read access request and a write access request, and when a type of the access request is a write access request, the processor further sends, to the memory device, data that App j needs to write into the memory device.

An access unit 803 configured to access the data of the running object according to the access request received by the receiving unit 801 and the first mapping relationship, and access the error-tolerant code of the running object according to the access request and the second mapping relationship.

Exemplarily, different reliability levels may correspond to different error-tolerant coding methods. In this embodiment of the present disclosure, there are four different reliability levels, which correspond to different error-tolerant coding methods in a one-to-one manner according to a preset correspondence between a reliability level and an error-tolerant coding method, as shown in Table 1. In addition, a reliability level of the process App j is Level 3, and an error-tolerant coding method corresponding to the reliability level is BCH coding.

Exemplarily, the mapping relationship establishing unit 802 is configured to query a preset correspondence table between the reliability level of the running object and the error-tolerant coding method according to the error-tolerant coding method in the reliability level information received by the receiving unit 801, so as to acquire the reliability level of the running object. The mapping relationship unit 802 is further configured to query a preset correspondence table between the reliability level and the data region according to the reliability level of the running object to acquire the data region corresponding to the reliability level of the running object, and generate the first mapping relationship, and query a preset correspondence table between the reliability level and the CECR according to the reliability level of the running object to acquire the CECR corresponding to the reliability level of the running object, and generate the second mapping relationship.

In this embodiment of the present disclosure, the first mapping relationship and the second mapping relationship may represent, in a form of a query table, identification information of the process, a reliability level, a data region in which data of the process is stored, and a CECR in which error-tolerant code corresponding to the data of the process is stored, where the identification information, the reliability level, the data region, and the CECR are in a one-to-one correspondence; however, the present disclosure is not limited thereto. With reference to a schematic diagram of memory regions shown in FIG. 4, for a data region 3 in which data of App j is stored and a CECR 3 in which the error-tolerant code corresponding to the data of the process is stored, a form of a query table may be an AMT. Referring to Table 2, Table 2 is an AMT in this embodiment of the present disclosure, and includes a process number, a reliability level of a process, a data region in which data of the process is stored, and a CECR in which error-tolerant code corresponding to the data of the process is stored.

The mapping relationship establishing unit 802 may query a preset correspondence table between the reliability level of the process and the error-tolerant coding method according to the error-tolerant coding method, that is, BCH coding, of App j in the reliability level information to obtain the reliability level, Level 3, of App j, and query a preset correspondence table between the reliability level and the data region to acquire that a data region corresponding to the reliability level, Level 3, of App j is the data region 3, and establish the first mapping relationship accordingly, where the first mapping relationship may indicate that the data of App j is mapped to the data region 3 Further, the mapping relationship establishing unit 802 may query a preset correspondence table between the reliability level and the CECR to acquire that a CECR corresponding to the reliability level, Level 3, of App j is the CECR 3, and establish the second mapping relationship accordingly, where the second mapping relationship may indicate that code of App j is mapped to the CECR 3.

Afterward, the mapping relationship establishing unit 802 may further add, to the AMT shown in Table 2, the identification information of the process App j in this embodiment that includes the process number, the reliability level, Level 3, of App j, the data region 3 in which the data of App j is stored, and the CECR 3 in which the error-tolerant code corresponding to the data of App j is stored.

In this embodiment, after the mapping relationship establishing unit 802 establishes the first mapping relationship and the second mapping relationship according to the reliability level information of the running object, the mapping relationship establishing unit 802 may store the data of the process App j into the data region 3 according to an entry of the process App j in the AMT, and after performing error-tolerant coding on the data of App j by means of BCH coding, writes an obtained code word into the CECR 3.

Further, if there is no data region 3 and/or CECR 3 in memory, the mapping relationship establishing unit 802 may allocate a corresponding data region and CECR to App j according to the first mapping relationship and the second mapping relationship.

The mapping relationship establishing unit 802 may allocate two regions, for example, the DR 3 and the CECR 3, in the memory to App j according to the AMT, and store the data of the process App j into the data region 3 according to the entry of the process App j in the AMT. After performing error-tolerant coding on the data of the App j using the error-tolerant coding method BCH coding, the mapping relationship establishing unit 802 writes an obtained code word into the CECR 3.

Figure 9:
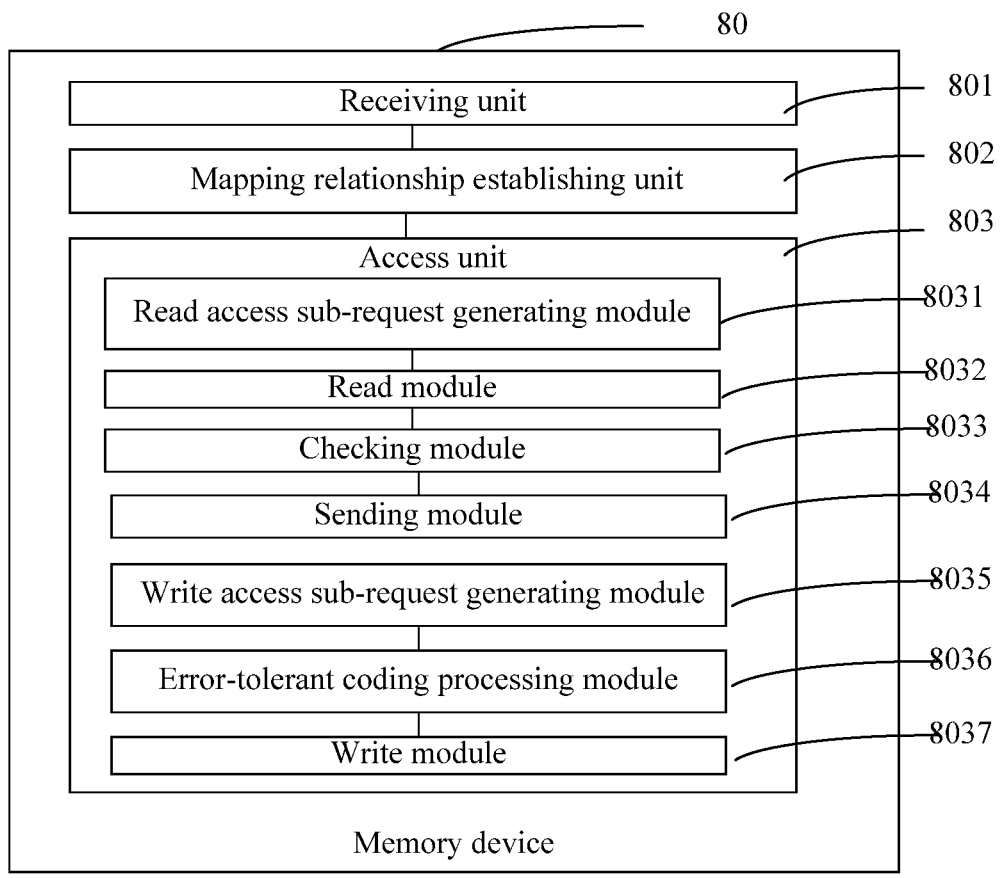
FIG. 9 is a schematic structure diagram of another memory device according to an embodiment of the present disclosure.

Exemplarily, the receiving unit 801 is configured to receive the access request sent by the processor, wherein the access request includes a read access request. Referring to FIG. 9, the access unit 803 includes the following.

A read access sub-request generating module 8031 configured to query the first mapping relationship according to the identification information of the running object to acquire the data region in which the data of the running object is stored, and generate a RD-d sub-request for the data region, wherein the RD-d sub-request includes the data region in which the data of the running object is stored and the physical address information of the data of the running object. The read access sub-request generating module 8031 is further configured to query the second mapping relationship according to the identification information of the running object to acquire the CECR in which the error-tolerant code of the running object is stored, and generate an error-tolerant RD-c sub-request for the CECR, wherein the RD-c sub-request includes the CECR in which the error-tolerant code of the running object is stored and the physical address information of the error-tolerant code of the object.

A read module 8032 configured to acquire the data of the running object by searching, in the data region included in the RD-d sub-request that is generated by the read access sub-request generating module 8031, for the physical address information of the data of the running object, and acquire the error-tolerant code of the running object by searching, in the CECR included in the RD-c sub-request that is generated by the read access sub-request generating module 8031, for the physical address information of the error-tolerant code of the running object.

A checking module 8033 configured to check, according to the error-tolerant code that is of the running object and read by the read module 8032, the data that is of the running object and read by the read module 8032 so as to acquire accurate data of the running object.

A sending module 8034 configured to send the accurate data of the running object to the processor, where the accurate data is obtained after the checking is performed by the checking module 8033.

In this embodiment, the read access sub-request generating module 8031 may query the AMT according to the process number in the read access request to obtain the data region 3 in which the data of the process App j is stored and the CECR 3 in which the error-tolerant code is stored. Further, the read access sub-request generating module 8031 may generate a RD-d sub-request for reading the data region 3 and a RD-c sub-request for reading the CECR 3, where the RD-d sub-request includes the data region 3 and the physical address information of the data of App j, and the RD-c sub-request includes the CECR 3 and the physical address information of the error-tolerant code of App j.

The read module 8032 may convert the two read access sub-requests into a series of commands that meet a memory chip standard, and send the commands to a memory chip so that the memory chip may acquire the data of App j by searching, in the data region included in the RD-d sub-request, for the physical address information of the data of App j, and acquire the error-tolerant code of App j by searching, in the CECR included in the RD-c sub-request, for the physical address information of the error-tolerant code of App j, and transmit the data and the error-tolerant code of App j to the memory device.

After receiving the data and the code word that are returned by the memory chip according to the two read access sub-requests, the checking module 8033 checks the data using the error-tolerant coding method BCH coding corresponding to the reliability level, Level 3, of App j, and after the check is successful, returns the data to the processor to execute step 306c. If the check is unsuccessful, persons skilled in the art may understand that the memory device will report an error, interrupt an access process, and return error information to the processor for processing.

Exemplarily, the receiving unit 801 is configured to receive the access request sent by the processor, where the access request includes a write access request and data that needs to be written into the memory device 80, and the write access request includes the identification information of the running object, physical address information of the data that needs to be written into the memory device 80, and physical address information of error-tolerant code of the data that needs to be written into the memory device 80.

Referring to FIG. 9, the access unit 803 includes a write access sub-request generating module 8035 configured to query the first mapping relationship according to the identification information of the running object to acquire the data region in which the data of the running object is stored, and generate a WR-d sub-request for the data region, where the WR-d sub-request includes the data region in which the data of the object is stored and the physical address information of the data that needs to be written into the memory device. The write access sub-request generating module 8035 is further configured to query the second mapping relationship according to the identification information of the running object to acquire the CECR corresponding to the running object, and generate a WR-c sub-request for the CECR, where the WR-c sub-request includes the CECR in which the error-tolerant code of the object is stored and the physical address information of the error-tolerant code of the data that needs to be written into the memory device 80.

The access unit 803 further includes an error-tolerant coding processing module 8036 configured to search the second mapping relationship using the identification information of the running object to obtain the error-tolerant coding method corresponding to the running object, perform, using the error-tolerant coding method corresponding to the object, error-tolerant coding processing on the data that needs to be written into the memory device 80 so as to acquire the error-tolerant code corresponding to the data that needs to be written into the memory device 80, and add, to a write request queue, the data that needs to be written into the memory device 80 and the error-tolerant code corresponding to the data that needs to be written into the memory device 80.

The access unit 803 further includes a write module 8037 configured to acquire, by searching in the data region included in the WR-d sub-request that is generated by the write access sub-request generating module 8035 for the physical address information of the data that needs to be written into the memory device 80, a first physical address of the data that needs to be written into the memory device 80, and write, into the first physical address, the data that is in the write request queue and needs to be written into the memory device 80. The write module 8037 is further configured to acquire, by searching in the CECR included in the WR-c sub-request that is generated by the write access sub-request generating module 8035 for the physical address information of the error-tolerant code of the data that needs to be written into the memory device 80, a second physical address of the error-tolerant code of the data that needs to be written into the memory device 80, and write, into the second physical address, the error-tolerant code that is in the write request queue and corresponds to the data that needs to be written into the memory device 80.

In this embodiment of the present disclosure, the write access sub-request generating module 8035 may query the AMT according to the process number in the write access request to obtain the data region 3 in which the data of the process App j is stored and the CECR 3 in which the error-tolerant code is stored, and generates a WR-d sub-request for writing into the data region 3 and a WR-c sub-request for writing into the CECR 3, where the WR-d sub-request includes the data region 3 and the physical address information of the data that needs to be written into the memory device, and the WR-c sub-request includes the CECR 3 and the physical address information of the error-tolerant code of the data that needs to be written into the memory device.

The error-tolerant coding processing module 8036 may obtain the error-tolerant coding method BCH coding corresponding to the reliability level, Level 3, of App j by querying the AMT, generate, according to the error-tolerant coding method, a code word for the data that needs to be written into memory device, and then add, to the write request queue, the data that needs to be written into memory device and the code word.

The write module 8037 converts the two write access requests into a series of commands that meet a memory chip standard, and sends the commands to a memory chip so that the memory chip respectively writes, into the first physical address and the second physical address, the data that needs to be written into the memory device and the error-tolerant code of the data that needs to be written into the memory device, where the data that needs to be written into the memory device and the error-tolerant code are in the write request queue.

Exemplarily, the receiving unit 801 is further configured to receive changed reliability level information sent by the processor, where the changed reliability level information includes the identification information of the running object and a new error-tolerant coding method that corresponds to a changed reliability level of the running object.

The mapping relationship establishing unit 802 is further configured to query the preset correspondence table between the reliability level of the running object and the error-tolerant coding method according to the new error-tolerant coding method that is in the changed reliability level information received by the receiving unit 801 and corresponds to the changed reliability level of the running object, and update the reliability level of the running object in the first mapping relationship and the second mapping relationship. The mapping relationship establishing unit 802 is further configured to query the preset correspondence table between the reliability level and the data region according to an updated reliability level of the running object in the first mapping relationship, and update the data region in the first mapping relationship. The mapping relationship establishing unit 802 is further configured to query the preset correspondence table between the reliability level and the CECR according to the updated reliability level of the running object in the second mapping relationship, and update the CECR in the second mapping relationship.

In this embodiment, the receiving unit 801 receives the changed reliability level information sent by the processor, where the changed reliability level information is obtained by the processor by combining the reliability level, the error-tolerant coding method, and the process number of the process App j, and where the reliability level of the process App j is adjusted from Level 3 to Level 4 according to a change in one or more items of a basis for setting the reliability level. It may be learned, by querying Table 1, that the error-tolerant coding method of the process App j is changed from BCH coding to MIRROR coding.

In this case, the mapping relationship establishing unit 802 may query the preset correspondence table between the reliability level of the process and the error-tolerant coding method according to the new error-tolerant coding method MIRROR of the process App j in the changed reliability level information received by the receiving unit 801 so as to obtain a new reliability level, Level 4, of App j. The mapping relationship establishing unit 802 may query the preset correspondence table between the reliability level and the data region to acquire a data region corresponding to the new reliability level, Level 4, of App j. It should be noted that whether a change of the data region corresponding to App j involves only migration in the data region of the data corresponding to App j has no direct relationship to a change of the reliability level. For convenience of description, it is assumed that the data region of App j does not change and may still be the data region 3 so that an updated first mapping relationship may indicate that the data of App j is mapped to the data region 3; however, the present disclosure is no limited thereto. The mapping relationship establishing unit 802 may query the preset correspondence table between the reliability level and the CECR to acquire that a CECR corresponding to the new reliability level, Level 4, of App j is a CECR 4, and update the second mapping relationship accordingly, where an updated second mapping relationship may indicate that code of App j is mapped to the CECR 4.

Further, the mapping relationship establishing unit 802 may change the entry of the process number App j in the AMT to the process number App j, a changed reliability level, Level 4, of App j, the data region 3 in which the data of App j is stored, and the CECR 4 in which new error-tolerant code corresponding to the data of App j is stored, as shown in Table 3.

After updating the data region in the first mapping relationship and the CECR in the second mapping relationship, the mapping relationship establishing unit 802 may migrate, according to the changed AMT shown in Table 3, the data of App j to a data region of the App j shown in Table 3, obtains new error-tolerant code for the data of App j according to the new error-tolerant coding method MIRROR corresponding to the data of App j, and migrates the new error-tolerant code of App j to the CECR 4.

Subsequently, the memory device 80 may access data according to the changed reliability level of App j. For an access process, refer to step 305 to step 306, which is not described herein again.

According to the memory device 80 provided in this embodiment of the present disclosure, the memory device 80 establishes a first mapping relationship and a second mapping relationship according to reliability level information of a running object sent by a processor, and separately accesses data and error-tolerant code of the running object according to the first mapping relationship, the second mapping relationship, and an access request that is sent by the processor. In this way, a hierarchical and flexible method for setting a memory reliability level is provided to implement a memory access mechanism for different running object types and different reliability levels.

Figure 10:
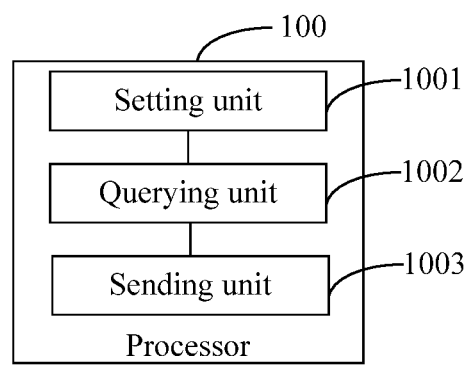
FIG. 10 is a schematic structure diagram of a processor according to an embodiment of the present disclosure.

An embodiment of the present disclosure provides a processor 100. Referring to FIG. 10, the processor 100 includes a setting unit 1001 configured to set a reliability level of a running object of the processor, where the reliability level of the running object represents a degree of a memory reliability requirement imposed by the running object. The processor 100 further includes a querying unit 1002 configured to query a preset correspondence between the reliability level of the running object and an error-tolerant coding method to obtain an error-tolerant coding method corresponding to the reliability level of the running object, where the reliability level is set by the setting unit 1001. The processor 100 further includes a sending unit 1003 configured to send reliability level information of the running object of the processor to a memory device, where the reliability level information is obtained by the querying unit 1002, and the reliability level information includes identification information of the running object and the error-tolerant coding method that corresponds to the reliability level of the running object.

Exemplarily, the sending unit 1003 may obtain reliability level information of App j according to identification information of App j and an error-tolerant coding method that corresponds to a reliability level of App j, and send the reliability level information to the memory device.

The sending unit 1003 is further configured to send an access request to the memory device, where the access request includes an identifier of the running object, physical address information of data of the running object, and physical address information of error-tolerant code of the running object.

Exemplarily, in this embodiment, the setting unit 1001 may set a reliability level of a process App j when initially scheduling and starting to run the process App j. Furthermore, a basis for setting the reliability level may include one or more of user definition, operating system setting, memory chip fault information, current operating mode, and the like, which is not limited in this embodiment.

Different reliability levels correspond to different error-tolerant coding methods. For convenience of description, in this embodiment of the present disclosure, there are four different reliability levels, which correspond to different error-tolerant coding methods in a one-to-one manner according to a preset correspondence between a reliability level and an error-tolerant coding method, as shown in Table 1.

The setting unit 1001 may set the reliability level of the process App j to Level 3, and the querying unit 1002 may learn, according to Table 1, that an error-tolerant coding method of the process App j is BCH coding.

Figure 11:
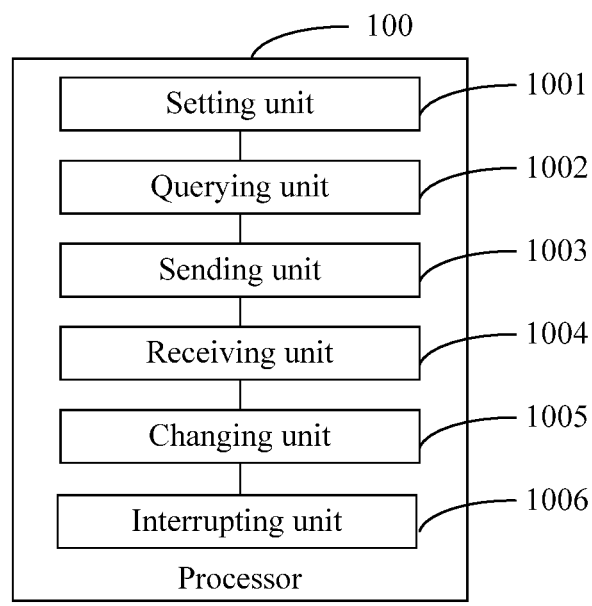
FIG. 11 is a schematic structure diagram of another processor according to an embodiment of the present disclosure.

Exemplarily, referring to FIG. 11, the processor 100 may further include a receiving unit 1004 configured to, when the access request is a read access request, receive data of the process App j sent by the memory device.

Exemplarily, when the access request is a write access request, the sending unit 1003 may further be configured to send, to the memory device, data that needs to be written into the memory device.

Exemplarily, referring to FIG. 11, the processor 100 further includes a changing unit 1005 configured to change the reliability level of the running object and obtain a new error-tolerant coding method that corresponds to a changed reliability level of the running object.

The sending unit 1003 is further configured to send changed reliability level information to the memory device, where the changed reliability level information is obtained by the changing unit, and the changed reliability level information includes the identification information of the running object and the new error-tolerant coding method that corresponds to the changed reliability level of the running object.

In this embodiment, the changing unit 1005 may adjust the reliability level of the process App j according to a change in one or more items of a basis for setting the reliability level. Moreover, referring to FIG. 11, the processor 100 may further include an interrupting unit 1006 configured to, before the changing unit 1005 performs adjustment, perform interrupt processing on the running process App j. For example, in this embodiment of the present disclosure, the reliability level of the process App j is adjusted from Level 3 to Level 4. In this case, by querying Table 1, it may be learned that the error-tolerant coding method of the process App j is changed from BCH coding to MIRROR coding.

Exemplarily, the interrupting unit 1006 may further be configured to recover from the interrupt, so as to continue to run the process App j.

According to the processor 100 for memory access provided in this embodiment of the present disclosure, a memory device establishes a first mapping relationship and a second mapping relationship according to reliability level information of a running object sent by the processor 100, and separately accesses data and error-tolerant code of the running object according to the first mapping relationship, the second mapping relationship, and an access request that is sent by the processor 100. In this way, a hierarchical and flexible method for setting a memory reliability level is provided to implement a memory access mechanism for different running object types and different reliability levels.

Figure 12:
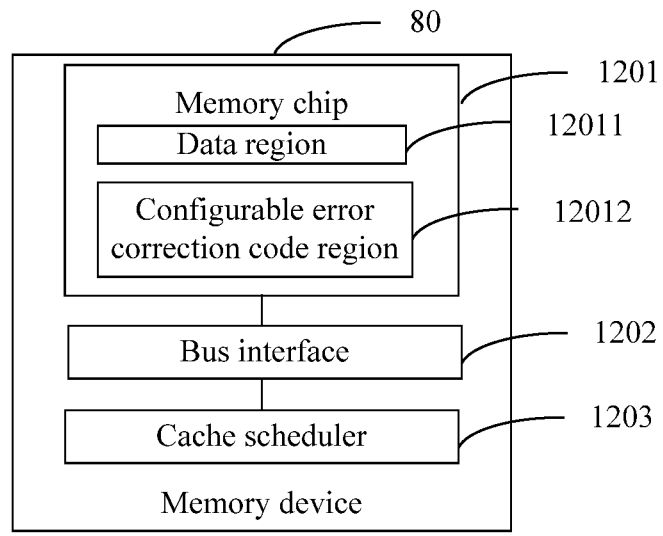
FIG. 12 is a hardware structure diagram of a memory device according to an embodiment of the present disclosure.

Referring to FIG. 12, an embodiment of the present disclosure provides a memory device 80, where the memory device 80 includes a memory chip 1201 that includes a data region 12011 and a CECR 12012. The data region 12011 is used to store data of a running object of a processor, and the CECR 12012 is used to store error-tolerant code corresponding to the data of the running object, where reference may be made to FIG. 4 for a specific schematic diagram of the regions. The memory device 80 further includes a bus interface 1202 configured to implement communication between the memory device in this embodiment and an external component, where exemplarily, the bus interface 1202 may be an Industry Standard Architecture (ISA) bus, a Peripheral Component Interconnect (PCI) bus, an Extended Industry Standard Architecture (EISA) bus, or the like, which is not limited in this embodiment of the present disclosure. The memory device 80 further includes a cache scheduler 1203, which may be an application-specific integrated circuit (ASIC) having a storage function, which is not limited in the present disclosure. The cache scheduler 1203 is configured to receive, through the bus interface 1202, reliability level information of the running object of the processor sent by the processor, where the reliability level information includes identification information of the running object and an error-tolerant coding method that corresponds to a reliability level of the running object, and the reliability level of the running object represents a degree of a memory reliability requirement imposed by the running object. The cache scheduler 1203 is further configured to establish a first mapping relationship and a second mapping relationship according to the reliability level information of the running object, where the first mapping relationship includes the identification information of the running object, the reliability level of the running object, and the data region 12011 in which the data of the running object is stored, where the identification information, the reliability level, and the data region 12011 are in a one-to-one correspondence, and the second mapping relationship includes the identification information of the running object, the reliability level of the running object, and the CECR 12012 in which the error-tolerant code corresponding to the data of the running object is stored, where the identification information, the reliability level, and the CECR 12012 are in a one-to-one correspondence. The cache scheduler 1203 is further configured to receive, through the bus interface 1202, an access request sent by the processor, where the access request includes the identification information of the running object of the processor, physical address information of the data of the running object, and physical address information of the error-tolerant code of the running object, and access the data of the running object according to the access request and the first mapping relationship, and access, according to the access request and the second mapping relationship, the error-tolerant code corresponding to the running object.

Exemplarily, the cache scheduler 1203 may be configured to query a preset correspondence table between the reliability level of the running object and the error-tolerant coding method according to the error-tolerant coding method in the reliability level information, so as to acquire the reliability level of the running object, query a preset correspondence table between the reliability level and the data region 12011 according to the reliability level of the running object to acquire the data region 12011 corresponding to the reliability level of the running object, and generate the first mapping relationship, and query a preset correspondence table between the reliability level and the CECR 12012 according to the reliability level of the running object to acquire the CECR 12012 corresponding to the reliability level of the running object, and generate the second mapping relationship.

Exemplarily, the cache scheduler 1203 receives, through the bus interface 1202, the access request sent by the processor, where the access request includes a read access request.

Correspondingly, the cache scheduler 1203 is configured to query the first mapping relationship according to the identification information of the running object to acquire the data region 12011 in which the data of the running object is stored, and generate a RD-d sub-request for the data region 12011, where the RD-d sub-request includes the data region 12011 in which the data of the running object is stored and the physical address information of the data of the running object. The cache scheduler 1203 is further configured to query the second mapping relationship according to the identification information of the running object to acquire the CECR 12012 in which the error-tolerant code of the running object is stored, and generate an error-tolerant RD-c sub-request for the CECR 12012, where the RD-c sub-request includes the CECR 12012 in which the error-tolerant code of the running object is stored and the physical address information of the error-tolerant code of the object, and transmit the RD-d sub-request and the RD-c sub-request to the memory chip 1201.

The memory chip 1201 is configured to acquire the data of the running object by searching, in the data region 12011 included in the RD-d sub-request, for the physical address information of the data of the running object, acquire the error-tolerant code of the running object by searching, in the CECR 12012 included in the RD-c sub-request, for the physical address information of the error-tolerant code of the running object, and return the data and the error-tolerant code of the running object to the cache scheduler 1203.

The cache scheduler 1203 is configured to check the data of the running object according to the error-tolerant code of the running object, so as to acquire accurate data of the running object, and send the accurate data of the running object to the processor 100, where the accurate data is obtained after the checking.

Exemplarily, the cache scheduler 1203 receives, through the bus interface 1202, the access request sent by the processor 100, where the access request includes a write access request and data that needs to be written into the memory device 80, the write access request includes the identification information of the running object, physical address information of the data that needs to be written into the memory device 80, and physical address information of error-tolerant code of the data that needs to be written into the memory device 80.

Correspondingly, the cache scheduler 1203 is configured to query the first mapping relationship according to the identification information of the running object to acquire the data region 12011 in which the data of the running object is stored, and generate a WR-d sub-request for the data region 12011, where the WR-d sub-request includes the data region 12011 in which the data of the object is stored and the physical address information of the data that needs to be written into the memory device 80. The cache scheduler 1203 is further configured to query the second mapping relationship according to the identification information of the running object to acquire the CECR 12012 corresponding to the running object, and generate a WR-c sub-request for the CECR 12012, where the WR-c sub-request includes the CECR 12012 in which the error-tolerant code of the object is stored and the physical address information of the error-tolerant code of the data that needs to be written into the memory device 80. The cache scheduler 1203 is further configured to search the second mapping relationship using the identification information of the running object to obtain the error-tolerant coding method corresponding to the running object, perform, using the error-tolerant coding method corresponding to the object, error-tolerant coding processing on the data that needs to be written into the memory device 80, so as to acquire the error-tolerant code corresponding to the data that needs to be written into the memory device. The cache scheduler 1203 is further configured to add, to a write request queue, the data that needs to be written into the memory device 80 and the error-tolerant code corresponding to the data that needs to be written into the memory device 80, and transmit the WR-d sub-request and the WR-c sub-request to the memory chip 1201.

The memory chip 1201 is configured to acquire, by searching in the data region 12011 included in the WR-d sub-request for the physical address information of the data that needs to be written into the memory device 80, a first physical address of the data that needs to be written into the memory device 80, and write, into the first physical address, the data that is in the write request queue and needs to be written into the memory device 80. The memory chip 1201 is further configured to acquire, by searching in the CECR 12012 included in the WR-c sub-request for the physical address information of the error-tolerant code of the data that needs to be written into the memory device 80, a second physical address of the error-tolerant code of the data that needs to be written into the memory device 80, and write, into the second physical address, the error-tolerant code that is in the write request queue and corresponds to the data that needs to be written into the memory device 80.

Exemplarily, the cache scheduler 1203 is further configured to receive, through the bus interface 1202, changed reliability level information sent by the processor 100, where the changed reliability level information includes the identification information of the running object, and a new error-tolerant coding method that corresponds to a changed reliability level of the running object. The cache scheduler 1203 is further configured to query the preset correspondence table between the reliability level of the running object and the error-tolerant coding method according to the new error-tolerant coding method that is in the changed reliability level information and corresponds to the changed reliability level of the running object, and update the reliability level of the running object in the first mapping relationship and the second mapping relationship. The cache scheduler 1203 is further configured to query the preset correspondence table between the reliability level and the data region 12011 according to an updated reliability level of the running object in the first mapping relationship, and update the data region 12011 in the first mapping relationship. The cache scheduler 1203 is further configured to query the preset correspondence table between the reliability level and the CECR 12012 according to the updated reliability level of the running object in the second mapping relationship, and update the CECR 12012 in the second mapping relationship.

According to the memory device 80 provided in this embodiment of the present disclosure, the memory device 80 establishes a first mapping relationship and a second mapping relationship according to reliability level information of a running object sent by a processor 100, and separately accesses data and error-tolerant code of the running object according to the first mapping relationship, the second mapping relationship, and an access request that is sent by the processor. In this way, a hierarchical and flexible method for setting a memory reliability level is provided to implement a memory access mechanism for different running object types and different reliability levels.

Figure 13:
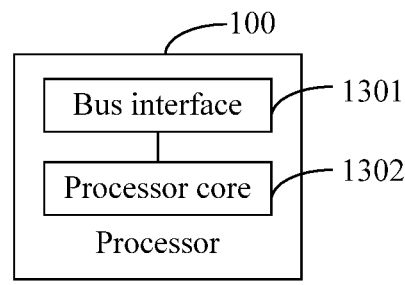
FIG. 13 is a hardware structure diagram of a processor according to an embodiment of the present disclosure.

Referring to FIG. 13, an embodiment provides a processor 100, which may be a CPU or an ASIC, which is not limited in the present disclosure, and includes a bus interface 1301 configured to implement communication between the processor in this embodiment and an external component, where exemplarily, the bus interface 1301 may be an ISA bus, a PCI bus, an EISA bus, or the like, which is not limited in this embodiment of the present disclosure. The processor 100 further includes a processor core 1302 configured to set a reliability level of a running object of the processor, where the reliability level of the running object represents a degree of a memory reliability requirement imposed by the running object, query a preset correspondence between the reliability level of the running object and an error-tolerant coding method to obtain an error-tolerant coding method corresponding to the reliability level of the running object, and send reliability level information of the running object of the processor to a memory device through the bus interface 1301, where the reliability level information includes identification information of the running object and the error-tolerant coding method that corresponds to the reliability level of the running object. The processor core 1302 is further configured to send an access request to the memory device 80 through the bus interface 1301, where the access request includes an identifier of the running object, physical address information of data of the running object, and physical address information of error-tolerant code of the running object.

Exemplarily, the processor core 1302 is further configured to change the reliability level of the running object and obtain a new error-tolerant coding method that corresponds to a changed reliability level of the running object, and send changed reliability level information to the memory device 80 through the bus interface 1301, where the changed reliability level information includes the identification information of the running object and the new error-tolerant coding method that corresponds to the changed reliability level of the running object.

According to the processor 100 for memory access provided in this embodiment of the present disclosure, a memory device establishes a first mapping relationship and a second mapping relationship according to reliability level information of a running object sent by the processor 100, and separately accesses data and error-tolerant code of the running object according to the first mapping relationship, the second mapping relationship, and an access request that is sent by the processor 100. In this way, a hierarchical and flexible method for setting a memory reliability level is provided to implement a memory access mechanism for different running object types and different reliability levels.

Figure 14:
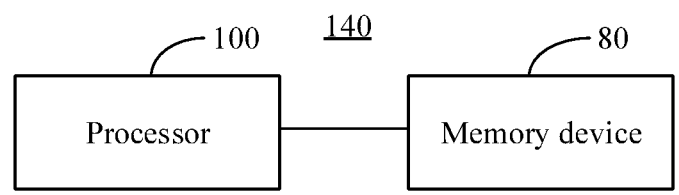
FIG. 14 is a schematic diagram of a memory access system according to an embodiment of the present disclosure.

Referring to FIG. 14, an embodiment of the present disclosure provides a memory access system 140, including the memory device 80 according to any one of the foregoing embodiments, and the processor 100 according to any one of the foregoing embodiments.

According to the memory access system 140 provided in this embodiment of the present disclosure, the memory device 80 establishes a first mapping relationship and a second mapping relationship according to reliability level information of a running object sent by the processor 100, and separately accesses data and error-tolerant code of the running object according to the first mapping relationship, the second mapping relationship, and an access request that is sent by the processor 100. In this way, a hierarchical and flexible method for setting a memory reliability level is implemented to implement a memory access mechanism for different running object types and different reliability levels.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The foregoing integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The foregoing software functional unit is stored in a storage medium and includes several instructions for instructing a computer device (which may be a personal computer, a server, or a network device) to perform some of the steps of the methods described in the embodiments of the present disclosure. The foregoing storage medium includes any medium that can store program code, such as a Universal Serial Bus (USB) flash drive, a removable hard disk, a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof; however, these modifications or replacements do not make the essence of corresponding technical solutions depart from the spirit and scope of the technical solutions in the embodiments of the present disclosure.

What is claimed is:

1. A memory access method, comprising:
   receiving, by a memory device, reliability level information of a running object of a processor sent by the processor, wherein the reliability level information comprises identification information of the running object and an error-tolerant coding method that corresponds to a reliability level of the running object, and wherein the reliability level of the running object represents a degree of a memory reliability requirement imposed by the running object;
   establishing, by the memory device, a first mapping relationship and a second mapping relationship according to the reliability level information of the running object, wherein the first mapping relationship relates the identification information of the running object and a data region in which data of the running object is stored, and wherein the second mapping relationship relates the identification information of the running object and a configurable error correction code region (CECR) in which error-tolerantcode corresponding to the data of the running object is stored;
   receiving, by the memory device, an access request sent by the processor, wherein the access request comprises the identification information of the running object of the processor, physical address information of the data of the running object, and physical address information of the error-tolerant code of the running object; and accessing, by the memory device, the data of the running object from the data region and the error-tolerant code of the running object from the CECR according to the access request, the first mapping relationship, and the second mapping relationship.

2. The method according to claim 1, wherein establishing, by the memory device, the first mapping relationship and the second mapping relationship according to the reliability level information of the running object comprises:

querying, by the memory device according to the error-tolerant coding method in the reliability level information, a preset correspondence table relating the reliability level of the running object and the error-tolerant coding method to acquire the reliability level of the running object;

querying, by the memory device according to the reliability level of the running object, a preset correspondence table relating the reliability level and the data region to acquire the data region corresponding to the reliability level of the running object;

querying, by the memory device according to the reliability level of the running object, a preset correspondence table relating the reliability level and the CECR to acquire the CECR corresponding to the reliability level of the running object;

generating the first mapping relationship according to the reliability level of the running object and data region corresponding to the reliability level of the running object; and generating the second mapping relationship according to the CECR corresponding to the reliability level of the running object.

3. The method according to claim 1, wherein the memory device receives the access request sent by the processor, wherein the access request comprises a read access request, and wherein accessing, by the memory device, the data of the running object from the data region and the error-tolerant code of the running object according to the access request, the first mapping relationship, and the second mapping relationship comprises:

querying, by the memory device, the first mapping relationship according to the identification information of the running object to acquire the data region in which the data of the running object is stored;

generating a data read access (RD-d) sub-request for the data region, wherein the RD-d sub-request comprises the data region in which the data of the running object is stored and the physical address information of the data of the running object;

querying the second mapping relationship according to the identification information of the running object to acquire the CECR in which the error-tolerant code of the running object is stored;

generating an error-tolerant code read access (RD-c) sub-request for the CECR, wherein the RD-c sub-request comprises the CECR in which the error-tolerant code of the running object is stored and the physical address information of the error-tolerant code of the running object;

acquiring, by the memory device, the data of the running object by searching, in the data region comprised in the RD-d sub-request, for the physical address information of the data of the running object;

acquiring the error-tolerant code of the running object by searching, in the CECR comprised in the RD-c sub-request, for the physical address information of the error-tolerant code of the running object;

error checking, by the memory device, the data of the running object according to the error-tolerant code of the running object to acquire accurate data of the running object; and sending, by the memory device, the accurate data of the running object to the processor, wherein the accurate data is obtained after the error checking.

4. The method according to claim 1, wherein the memory device receives the access request sent by the processor, wherein the access request comprises a write access request and data that needs to he written into the memory device, wherein the write access request comprises the identification information of the running object, physical address infonuation of the data that needs to be written into the memory device, and physical address information of error-tolerant code of the data that needs to be written into the memory device, and wherein accessing, by the memory device, the data of the running object from the data region and the error-tolerant code of the running object according to the access request, the first mapping relationship, and the second mapping relationship comprises:

querying, by the memory device, the first mapping relationship according to the identification information of the running object to acquire the data region in which the data of the running object is stored;

generating a data write access (WR-d) sub-request for the data region, wherein the WR-d sub-request comprises the data region in which the data of the running object is stored and the physical address information of the data that needs to be written into the memory device;

querying the second mapping relationship according to the identification information of the running object to acquire the CECR corresponding to the running object;

generating an error-tolerant code write access (WR-c) sub-request for the CECR, wherein the WR-c sub-request comprises the CECR in which the error-tolerant code of the running object is stored and the physical address information of the error-tolerant code of the data that needs to be written into the memory device;

searching, by the memory device, the second mapping relationship using the identification information of the running object to obtain the error-tolerant coding method corresponding to the running object;

performing, using the error-tolerant coding method corresponding to the running object, error-tolerant coding processing on the data that needs td be written into the memory device to acquire the error-tolerant code corresponding to the data that needs to be written into the memory device;

adding, to a write request queue, the data that needs to be written into the memory device and the error-tolerant code corresponding to the data that needs to be written into the memory device;

acquiring, by the memory device searching in the data region comprised in the WR-d sub-request for the physical address information of the data that needs to be written into the memory device, a first physical address of the data that needs to be written into the memory device;

writing, into the first physical address, the data that is in the write request queue and needs to be written into the memory device;

acquiring, by searching in the CSCR comprised in the WR-c sub-request for the physical address information of the error-tolerant code of the data that needs to be written into the memory device, a second physical address of the error-tolerant code of the data that needs to be written into the memory device; and writing, into the second physical address, the error-tolerant code that is in the write request queue and corresponds to the data that needs to be written into the memory device.

5. The method according to claim 1, further comprising:
receiving, by the memory device, changed reliability level information sent by the processor, wherein the changed reliability level information comprises the identification information of the running object and a new error-tolerant coding method that corresponds to a changed reliability level of the running object;

querying, by the memory device according to the new error-tolerant coding method that is in the changed reliability level information and corresponds to the changed reliability level of the running object, a preset correspondence table relating the reliability level of the running object and the error-tolerant coding method;

updating the reliability level of the running object in the first mapping relationship and the second mapping relationship;

querying, by the memory device according to an updated reliability level of the running object in the first mapping relationship, a preset correspondence table relating the reliability level and the data region;

updating the data region in the first mapping relationship;

querying, by the memory device according to the updated reliability level of the running object in the second mapping relationship, a preset correspondence table relating the reliability level and the CECR; and updating the CECR in the second mapping relationship.

6. A memory access method, comprising:
setting, by a processor, a reliability level of a running object of the processor, wherein the reliability level of the running object represents a degree of a memory reliability requirement imposed by the running object;

querying, by the processor, a preset correspondence table relating the reliability level of the running object and an error-tolerant coding method to obtain an error-tolerant coding method corresponding to the reliability level of the running object;

sending reliability level information of the running object of the processor to a memory device, wherein the reliability level information comprises identification information of the running object and the error-tolerant coding method that corresponds to the reliability level of the running object so that the memory device establishes a first mapping relationship and a second mapping relationship according to the reliability level information of the running object, wherein the first mapping relationship relates the identification information of the running object, the reliability level of the running object, and a data region in which data of the running object is stored, and wherein the second mapping relationship relates the identification information of the running object, the reliability level of the running object, and a configurable error correction code region (CECR) in which error-tolerant code corresponding to the data of the running object is stored; and sending, by the processor, an access request to the memory device, wherein the access request comprises the identification information of the running object, physical address information of the data of the running object, and physical address information of the error-tolerant code of the running object so that the memory device accesses the data of the running object from the data region and a the error-tolerant code of the running object from the CECR according to the access request, the first mapping relationship, and the second mapping relationship.

7. The method according to claim 6, wherein the first mapping relationship comprises a first indication of the reliability level of the running object, wherein the second mapping relationship comprises a second indication of the reliability level of the running object, and wherein the method further comprises:

changing, by the processor, the reliability level of the running object and obtaining a new error-tolerant coding method that corresponds to a changed reliability level of the running object; and sending, by the processor, changed reliability level information to the memory device, wherein the changed reliability level information comprises the identification information of the running object and the new error-tolerant coding method that corresponds to the changed reliability level of the running object, and wherein sending the changed reliability level information to the memory device is configured to cause the memory device to:

query, according to the new error-tolerant coding method that is in the changed reliability level information and corresponds to the changed reliability level of the running object, the preset correspondence table relating the reliability level of the running object and the error-tolerant coding method;

update the first indication of the reliability level of the running object in the first mapping relationship and the second indication of the reliability level of the running object in the second mapping relationship;

query, according to the updated first indication of the reliability level of the running object in the first mapping relationship, a preset correspondence table relating the reliability level and the data region;

update the data region in the first mapping relationship;

query, according to the updated second indication of the reliability level of the running object in the second mapping relationship, a preset correspondence table relating the reliability level and the CECR; and update the CECR in the second mapping relationship.

8. A memory device, comprising:
a processor;
a memory chip coupled to the processor and comprising a data region and a configurable error correction code region (CECR), wherein the data region is used to store data of a running object of the processor, and wherein the CECR is used to store error-tolerant code corresponding to the data of the running object; and a cache scheduler coupled to the memory chip and the processor and configured to:
receive reliability level information of the running object of the processor sent by the processor, wherein the reliability level information comprises identification information of the running object and an error-tolerant coding method that corresponds to a reliability level of the running object, and wherein the reliability level of the running object represents a degree of a memory reliability requirement imposed by the running object;

establish a first mapping relationship and a second mapping relationship according to the reliability level information of the running object, wherein the first mapping relationship relates the identification information of the running object and the data region in which the data of the running object is stored, and wherein the second mapping relationship relates the identification information of the running object and the CECR in which the error-tolerant code corresponding to the data of the running object is stored;

receive an access request sent by the processor, wherein the access request comprises the identification information of the running object of the processor, physical address information of the data of the running object, and physical address information of the error-tolerant code of the running object, and access the data of the running object and the error-tolerant code corresponding to the running object according to the access request, the first mapping relationship, and the second mapping relationship.

9. The memory device according, to claim 8, wherein the cache scheduler is further configured to:

query, according to the error-tolerant coding method in the reliability level information, a preset correspondence table relating the reliability level of the running object and the error-tolerant coding method to acquire the reliability level of the running object;

query, according to the reliability level of the running object, a preset correspondence table relating the reliability level and the data region to acquire the data region corresponding to the reliability level of the running object;

query, according to the reliability level of the running object, a preset correspondence table relating the reliability level and the CECR to acquire the CECR corresponding to the reliability level of the running object;

generate the first mapping relationship according to the reliability level of the running object and data region corresponding to the reliability level of the running object; and generate the second mapping relationship according to the CECR corresponding to the reliability level of the running object.

10. The memory device according to claim 8, wherein the access request comprises a read access request, wherein the cache scheduler is further configured to:

query the first mapping relationship according to the identification information of the running object to acquire the data region in which the data of the running object is stored;

generate a data read access (RD-d) sub-request for the data region, wherein the RD-d sub-request comprises the data region in which the data of the running object is stored and the physical address information of the data of the running object;

query the second mapping relationship according to the identification information of the running object to acquire the CECR in which the error-tolerant code of the running object is stored;

generate an error-tolerant code read access (RD-c) sub-request for he CECR, wherein the RD-c sub-request comprises the CECR in which the error-tolerant code of the running object is stored and the physical address information of the error-tolerant code of the object; and transmit the RD-d sub-request and the RD-c sub-request to the memory chip, wherein the memory chip is configured to:
  acquire the data of the running object by searching, in the data region comprised in the RD-d sub-request, for the physical address information of the data of the running object;
  acquire the error-tolerant code of the running object by searching, in the CECR comprised in the RD-c sub-request, for the physical address information of the error-tolerant code of the running object; and
  return the data and the error-tolerant code of the running object to the cache scheduler, and wherein the cache scheduler is further configured to:
  error check the data of the running object according to the error-tolerant code of the running object to acquire accurate data of the running object; and
  send the accurate data of the running object to the processor, wherein the accurate data is obtained after error checking the data.

11. The memory device according to claim 8, wherein the access request comprises a write access request and data that needs to be written into the memory device, wherein the write access request comprises the identification information of the running object, physical address information of the data that needs to be written into the memory device, and physical address information of error-tolerant code of the data that needs to he written into the memory device, and wherein the cache scheduler is further configured to:

query the first mapping relationship according to the identification information of the running object to acquire the data region in which the data of the running object is stored;

generate a data write access (WR-d) sub-request for the data region, wherein the WR-d sub-request comprises the data region in which the data of the running object is stored and the physical address information of the data that needs to be written into the memory device;

query the second mapping relationship according to the identification information of the running object to acquire the CECR corresponding to the running object;

generate an error-tolerant code write access (WR-c) sub-request for, the CECR, wherein the WR-c sub-request comprises the CECR in which the error-tolerant code of the running object is stored and the physical address information of the error-tolerant code of the data that needs to be written into the memory device;

search the second mapping relationship using the identification information of the running object to obtain the error-tolerant coding method corresponding to the running object;

perform, using the error-tolerant coding method corresponding to the running object, error-tolerant coding processing on the data that needs to be written into the memory device to acquire the error-tolerant code corresponding to the data that needs to be written into the memory device;

add, to a write request queue, the data that needs to be written into the memory device and the error-tolerant code corresponding to the data that needs to be written into the memory device; and transmit the WR-d sub-request and the WR-c sub-request to the memory chip, and wherein the memory chip is configured to:

acquire, by searching in the data region comprised in the WR-d sub-request for the physical address information of the data that needs to be written into the memory device, a first physical address of the data that needs to be written into the memory device;

write, into the first physical address, the data that is in the write request queue and needs to be written into the memory device;

acquire, by searching in the CECR comprised in the WR-c sub-request, for the physical address information of the error-tolerant code of the data that needs to be written into the memory device, a second physical address of the error-tolerant code of the data that needs to be written into the memory device; and write, into the second physical address, the error-tolerant code that is in the write request queue and corresponds to the data that needs to be written into the memory device.

12. The memory device according to claim 9, wherein the cache scheduler is further configured to:

receive changed reliability level information sent by the processor, wherein the changed reliability level information comprises the identification information of the running object and a new error-tolerant coding method that corresponds to a changed reliability level of the running object;

query, according to the new error-tolerant coding method that is in the changed reliability level information and corresponds to the changed reliability level of the running object, the preset correspondence table relating the reliability level of the running object and the error-tolerant coding method;

update the reliability level of the running object in the first mapping relationship and the second mapping relationship;

query, according to an updated reliability level of the running object in the first mapping relationship, the preset correspondence table relating the reliability level and the data region;

update the data region in the first mapping relationship;

query, according to the updated reliability level of the running object in the second mapping relationship, the preset correspondence table relating the reliability level and the CECR; and update the CECR in the second mapping relationship.

13. The method of claim 1, wherein the running object corresponds to at least one of an application program, a thread, a process, or a code segment.

* * * * *

UNITED STATES PATENT AND TRADEMARK OFFICE
CERTIFICATE OF CORRECTION

PATENT NO. : 9,772,891 B2  
APPLICATION NO. : 15/015303  
DATED : September 26, 2017  
INVENTOR(S) : Shuchang Shan et al.

Page 1 of 1

It is certified that error appears in the above-identified patent and that said Letters Patent is hereby corrected as shown below:

On the Title Page

Page 2, Column 2, Line 13: Other Publications should read:  
Foreign Communication From A Counterpart Application, Korean Application No. 10-2016-7005832, Korean Notice of Allowance and English Translation dated September 23, 2016, 3 pages.

Signed and Sealed this  
Twenty-sixth Day of December, 2017

Joseph Matal  
*Performing the Functions and Duties of the*  
*Under Secretary of Commerce for Intellectual Property and*  
*Director of the United States Patent and Trademark Office*